United States Patent [19]
Inazumi

[11] Patent Number: 5,481,644
[45] Date of Patent: Jan. 2, 1996

[54] NEURAL NETWORK SPEECH RECOGNITION APPARATUS RECOGNIZING THE FREQUENCY OF SUCCESSIVELY INPUT IDENTICAL SPEECH DATA SEQUENCES

[75] Inventor: Mitsuhiro Inazumi, Suwa, Japan

[73] Assignee: Seiko Epson Corporation, Tokyo, Japan

[21] Appl. No.: 102,859

[22] Filed: Aug. 6, 1993

[30] Foreign Application Priority Data

Aug. 6, 1992 [JP] Japan .................................... 4-210422
Aug. 5, 1993 [JP] Japan .................................... 5-213363

[51] Int. Cl.$^6$ ...................................................... G10L 9/00
[52] U.S. Cl. .............................................. 395/2.41; 395/11
[58] Field of Search .................................. 395/2.11, 2.41, 395/2.68, 23, 24, 2, 2.1, 2.4, 2.67, 21

[56] References Cited

U.S. PATENT DOCUMENTS

| | | | |
|---|---|---|---|
| 4,947,482 | 8/1990 | Brown ........................................ | 395/24 |
| 5,014,219 | 5/1991 | White ......................................... | 395/23 |
| 5,040,215 | 8/1991 | Amano et al. ........................... | 395/2.41 |
| 5,046,019 | 9/1991 | Basehore ................................... | 395/11 |
| 5,182,794 | 1/1993 | Gasperi et al. ............................ | 395/23 |
| 5,247,584 | 9/1993 | Krogman ................................... | 395/11 |
| 5,285,522 | 2/1994 | Mueller ..................................... | 395/2.41 |
| 5,285,523 | 2/1994 | Takahashi .................................. | 395/11 |

FOREIGN PATENT DOCUMENTS

| | | |
|---|---|---|
| 0318858 | 6/1989 | European Pat. Off. . |
| 0510632A2 | 10/1992 | European Pat. Off. . |

OTHER PUBLICATIONS

C. Iooss, "From Lattices of Pnonemes to Sentences: A Recurrent Neural Network Approach", Int'l Joint Conf. on Neural Networks, Jul. 8–14, 1991, vol. 2, pp. 833–838.

A. N. Michel, "Associative Memories via Artificial Neural Networks", *IEEE Control Systems Magazine*, Apr. 1990, pp. 6–17.

M. Sompolinsky, "Chaos in Random Neural Networks", *Physical Review Letter*, Jul. 18, 1988, pp. 259–262.

Palakal et al., "Speaker–Invariant Phoneme Recognition Using Multiple Neural Network Models", 1991 IEEE Int'l. Conf. on Neural Networks, Jul. 8–11, 1991, pp. 839–844.

Naylor et al., "The Application of Neural Networks to Wordspotting", 1992 26th Asilomar Conf. on Signals, Systems & Computers, Oct. 26–28, 1992, pp. 1081–1085.

K. P. Li, et al., "A Whole Word Recurrent Neural Network for Keyword Spotting", *ICASSP*, Mar. 1992, pp. II-81–II-84.

N. Z. Hakim et al., "Cursive Script Online Character Recognition with a Recurrent Neural Network Model", *IJCNN*, Jun. 1992, pp. III-711–III-716.

John Hertz et al., "Introduction to the Theory of Neural Computation", Santa Fe Institute Studies in the Sciences of Complexity, Lecture Notes, vol. 1, Addison–Wesley, 1991, pp. 173–187.

*Primary Examiner*—Allen R. MacDonald
*Assistant Examiner*—Michael A. Sartori
*Attorney, Agent, or Firm*—Oliff & Berridge

[57] ABSTRACT

The speech recognition apparatus recognizes a frequency of successively input identical speech data sequences. The speech recognition apparatus includes a speech recognition non-layered neural network unit. Speech data sequence is inputted as feature vectors from a feature extracting unit. The neural network performs speech recognition and determines whether the input speech data sequence matches at least one predetermined speech data sequence. The neural network generates a speech recognition signal when the input speech data sequence matches the at least one predetermined speech data sequence. A recognition signal detecting unit outputs a reset instruction signal each time the neural network generates the speech recognition signal. An internal state value setting unit resets the neural network unit to an initial state each time the recognition signal detecting unit outputs the reset instruction signal. Since the neural network unit is reset each time the speech recognition signal is outputted, accurate detection can be achieved even when speech data sequence to be recognized is inputted successively.

55 Claims, 19 Drawing Sheets

NEURAL NETWORK SPEECH RECOGNITION APPARATUS RECOGNIZING THE FREQUENCY OF SUCCESSIVELY INPUT IDENTICAL SPEECH DATA SEQUENCES

BACKGROUND OF THE INVENTION

1. Field of the Invention

This invention relates to a speech recognition using neural network.

2. Description of the Related Art

Speech recognition apparatuses using neural networks are currently known. This type of speech recognition apparatus learns recognition object speech data sequence before hand. When the input speech data sequence matches with the recognition object speech data sequence, the speech recognition apparatus outputs a speech recognition signal.

This conventional speech recognition apparatus is required to be simple in learning for recognizing the speech data sequence and to have a high degree of recognition precision for actual input speech data sequence. Even when recognition object identical speech data sequence is successively inputted, it is required to accurately recognize how many speech data sequence were successively inputted.

However, the conventional speech recognition apparatus did not satisfy the foregoing requirements completely.

The methods for practical use in the conventional speech recognition apparatus are chiefly grouped into two methods, i.e. a DP matching method and a hidden Markov model (HMM). These methods are described in detail in, for example, a book "Speech recognition By Stochastic Model" by Seiichi Nakagawa.

In short, in the DP matching process assumes the correspondence between the beginning and terminating ends of input and standard data, the contents thereof being transformed by the use of various time normalizing functions. Distance between the pattern transformed to have smallest difference and the standard pattern is judged to be lost points for the standard pattern. From a plurality of stadard patterns, a standard pattern having the minimum number of lost points is selected to be the results of matching.

On the other hand, the HMM process performs the speech recongnition through a stochastic process. An HMM model corresponding to a standard pattern in the DP process is established. One HMM model comprises a plurality of states and a plurality of transitions. Existence probability is given to the respective one of the states while transition and output probabilities are provided to the respective one of the transitions. Thus, a probability at which a certain HMM model generates a time series pattern can be calculated.

However, both in the DP matching method and in the HMM method it is required to define the start end and the terminal end of speech data sequence inputted during learning and speech recognition.

For performing speech recognition process which appears not to be dependent on the start end and the terminal end, it is necessary to find the start end and the terminal end by trial and error, taking a very long time for the process. For example, assume that data belonging to a certain category is to be detected from a pattern of length N. In this case, the start end position has possibilities to N order while the terminal end position has possibilities to N order. Namely, a combination of the start and terminal ends have possibilities to $N^2$ order. Therefore, for all of very many combinations, recognition process finding the start end and terminal end which give the best result have to be conducted by trial and error, thus taking a very long time for the process.

The conventional art has a more essential problem with assuming the existence of the start and terminal ends, compared to the quantitative problem with the number of combinations of the start and terminal ends. Namely, under the condition that only a single piece of data of a particular category is contained in the input data, the start and terminal ends are definite. However, in the present circumstances, such condition can scarcely be realized. In the case where input data contains consecutive data of different categories, their borders are indefinite. Furthermore, in time series information such as speech, there definitely do not exist borders between data, and consecutive data of two categories changes from one side to the other via a transition region where the information overlaps.

Therefore, from an accuracy view point, there is a very significant problem with creating standard data by the data assuming the start and terminal ends and performing learning of parameters of the HMM method by such data.

In order to solve these problems, various ideas specified for particular problems have long been cherished, or good results cannot be obtained. Such ideas have not been known generally.

As another conventional art, the MLP method using back propagation learning algorithm and multilayer perceptrons is known. This method is disclosed in, for example, a book "Speech, Auditory Perception and Neural Network Model" (Ohm Co., Ltd.) written by S. Nakagawa, K. Shikano and Y. Tohkura.

The MLP method is basically a method of recognizing static data. In order to recognize time series data, the temporal structure of the input data must be reflected in the structure of neural network. The most popular measure for this method is to input data of a certain time range as a single input data and to process temporal information equivalently. This time range should be fixed in view of the structure of MLP.

However, the length of actual time series data varies greatly, depending on the category or even in the same category. For example, regarding phonemes in speech, the average length of vowels or long phonemes is different over ten times from that of plosives or short phonemes. Even in the same phonemes, the actual length in speech fluctuates over two times. Consequently, assuming that the input range of data is set to an average length, if a short phoneme is to be discriminated, many speech data sequence other than recognition object data are contained in the input data. If a long phoneme is to be discriminated, only part of recognition object data is contained in the input data. Any of the these would be a cause to lower the recognition ability. Even if a different length is set for every phoneme, the length of the phoneme itself would vary, which is nothing to solve the problems.

In the MLP method, since the start and terminal ends of the data input range must be defined, it is difficult to perform accurate speech recognition during actual recognition action in which the input data length fluctuates.

In addition, if detection object data, for example data A are contained plurally in the input data, it is impossible to definitely detect how many data A exists in the input data. This problem would be particularly great when the speech recognition apparatus is used for the case where data consists of continuous input of an identical recognition object category.

SUMMARY OF THE INVENTION

An object of this invention relates to a speech recognition apparatus which can recognize input speech data sequence accurately and also can recognize the frequency of inputting particularly when recognition object speech data sequence is successively inputted.

According to a first aspect of the invention, there is provided a speech recognition apparatus which fulfils the above object and recognizes identical speech data sequence to be inputted successively, comprising:

feature extracting means for segmenting input speech data sequence into in units of frames and converting the segmental speech data sequence into a feature vector and for outputting the feature vectors successively;

speech recognition neural network means for learning previously so as to recognize predetermined speech data sequence based on speech data sequence inputted as the feature vectors from the feature extracting means and for outputting a speech recognition signal if the input speech data sequence matches with speech data sequence to be recognized;

recognition signal detection means for detecting the speech recognition signal outputted from the speech recognition neural network means and for outputting a reset instruction signal; and internal state value setting means for presetting an initial value of internal state value of the speech recognition neural network means, for resetting the speech recognition neural network means based on the reset instruction signal and for setting the internal state value to the initial value.

With the first arrangement, the speech recognition neural network means outputs a speech recognition signal each time the input speech data sequence matches with the recognition object speech data sequence.

The recognition signal detecting means outputs a reset instruction signal to the internal state value setting means each time the speech recognition signal is outputted.

Based on the reset instruction signal, the internal state value setting means resets the speech recognition neural network means to set its internal state value to an initial value.

Thus, in the case where the recognition object speech data sequence is inputted successively, since the neural network means is reset upon every speech recognition action, it is possible to accurately recognize the consecutive input speech data sequence upon every input. As a result, it is also possible to accurately recognize the number of identical speech data sequence successively inputted.

Preferably, the speech recognition neural network means is composed of a plurality of interconnected neurons each having an internal state value X is set, each of the neurons being a dynamic neuron in which the internal state value X changes with time to a value which satisfies input data Zj(j=1 to n where n is a natural number) to be given to the neuron and a function X=G(X, Zj) expressed using the internal state value X, the dynamic neuron being formed to convert the internal state value X into an output value, which satisfies a function F(X). The internal state value setting means includes a buffer memory, in which the internal state value of each neuron while the speech recognition neural network means is stable is to be set as an initial value, whereby each neuron of the speech recognition neural network means is reset based on the reset instruction signal and the internal state value is set to the initial value stored in the buffer memory.

Since the speech recognition neural network means is composed of plural dynamic neurons, the temporal structure of input data can be expressed within the internal state value which varies with time so as to satisfy a predetermined function, and the connection weight of the neuron. Therefore it is possible to accurately recognize input data, which varies greatly with time, by simple learning.

The recognition signal detecting means may be constructed so as to output the reset instruction signal when the speech recognition signals are outputted from the speech recognition neural network means continuously for a predetermined time.

The function X=G(X,Zj) may be expressed by Formula 5.

$$\tau \frac{d}{dt} X = -X + \sum_{j=1}^{n} Z_j \qquad \text{[Formula 5]}$$

Alternatively, the function X=G(X,Zj) may be expressed by Formula 6

$$\tau \frac{d}{dt} X_i = -X_i + \sum_{j=1}^{n} W_{ij}Y_j + D_i + \theta_i \qquad \text{[Formula 6]}$$

where Wij is the connection strength to connect the output of j-th neuron to the input of i-th neuron, Di is an external input value, and θi is a bias value.

In another alternative form, the function X=G(X,Zj) may be expressed by Formula 7

$$\tau \frac{d}{dt} X = -X + S\left(\sum_{j=1}^{n} Z_j\right) \qquad \text{[Formula 7]}$$

using a sigmoid function S.

In still another alternative form, the function X=G(X,Zj) may be expressed by Formula 8

$$\tau \frac{d}{dt} X_i = -X_i + S\left(\sum_{j=1}^{n} W_{ij}Y_j + D_i + \theta_i\right) \qquad \text{[Formula 8]}$$

where S is a sigmoid function, Wij is a connection strength in which the output of j-th neuron is to be connected to the input of i-th neuron, Di is an external input value, and θi is a bias value.

The speech recognition neural network means may include an input neuron which receive the feature vector of the speech data sequence, and a recognition result output neuron which outputs the recognition result of the speech data sequence.

Alternatively, the speech recognition neural network means may include a plurality of input neurons to which the feature vectors are to be inputted, a first output neuron for outputting a positive signal only if the input speech data sequence matches with speech data sequence to be recognized, and a second output neuron for outputting a negative signal only if the input speech data sequence does not match with the speech data sequence to be recognized.

The function F(X) in foregoing equations may be a sigmoid function.

Alternatively, the function F(X) in foregoing equations may be a threshold function.

Each dynamic neuron may receive, as the input data Zj, data fed back by multiplying the own neuron's output Y by a weight.

Also, each dynamic neuron may receive, as the input data Zj, another neuron's output multiplied by a weight.

Furthermore, each dynamic neuron may receive, as the input data Zj, desired data given from outside.

According to a second aspect of the invention, there is provided a speech recognition apparatus which recognizes identical speech data sequence to be inputted successively, comprising:

feature extracting means for segmenting input speech data sequence into in units of frames and converting the input data into feature vectors and for outputting the feature vectors successively;

first speech recognition neural network means for learning previously so as to recognize predetermined speech data sequence based on speech data sequence inputted as the feature vectors from the feature extracting means and for outputting a speech recognition signal if the input speech data sequence matches with speech data sequence to be recognized;

recognition signal detection means for outputting an action instruction signal upon each detection of the speech recognition signal outputted from the first speech recognition neural network means;

second speech recognition neural network means for learning previously so as to recognize the predetermined speech data sequence based on the speech data sequence inputted as the feature vectors from the feature extracting means and for outputting a speech recognition signal, each time the action instruction signal is outputted, if the speech data sequence matches with the data to be recognized; and output synthesis means for selecting one of the speech recognition signals outputted from the first and second speech recognition neural network means and for outputting the selected signal as the speech recognition signal.

With the second arrangement, in the case where identical speech data sequence to be recognized is inputted successively, the first and second speech recognition neural network means alternately take action to recognize the speech data sequence accurately. As a result, it is also possible to accurately recognize the number of identical speech data sequence being successively inputted.

The second speech recognition neural network means may be designed to reset each time it has performed the speech recognition action.

Alternatively, the second speech recognition neural network means may be designed to reset each time it has acted for a predetermined time.

Preferably, the speech recognition neural network means is composed of a plurality of interconnected neurons each having an internal state value X is set, each of the neurons being a dynamic neuron in which the internal state value X changes with time to a value which satisfies a function $X=G(X,Zj)$ expressed using input data $Zj(j=1$ to $n$ where $n$ is a natural number) to be given to the neuron and the internal state value X, the dynamic neuron being formed to convert the internal state value X into an output value, which satisfies a function $F(X)$.

The function $X=G(X,Zj)$ may be expressed by Formula 9.

$$\tau \frac{d}{dt} X = -X + \sum_{j=1}^{n} Z_j \qquad \text{[Formula 9]}$$

Alternatively, the function $X=G(X,Zj)$ may be expressed by Formula 10

$$\tau \frac{d}{dt} X_i = -X_i + \sum_{j=1}^{n} W_{ij}Y_j + D_i + \theta_i \qquad \text{[Formula 10]}$$

where Wij is a connection strength in which the output of j-th neuron is to be connected to the input of i-th neuron, Di is an external input value, and θi is a bias value.

In another alternative form, the function $X=G(X,Zj)$ may be expressed by Formula 11

$$\tau \frac{d}{dt} X = -X + S\left( \sum_{j=1}^{n} Z_j \right) \qquad \text{[Formula 11]}$$

using a sigmoid function S.

In still another alternative form, the function $X=G(X,Zj)$ may be expressed by Formula 12

$$\tau \frac{d}{dt} X_i = -X_i + S\left( \sum_{j=1}^{n} W_{ij}Y_j + D_i + \theta_i \right) \qquad \text{[Formula 12]}$$

where S is a sigmoid function, Wij is a connection strength in which the output of j-th neuron is to be connected to the input of i-th neuron, Di is an external input value, and θi is a bias value.

The speech recognition neural network means may include an input neuron which receive the feature vector of the speech data sequence, and a recognition result output neuron which outputs the recognition result of the speech data sequence.

Alternatively, the speech recognition neural network means may include a plurality of input neurons to which the feature vectors are to be inputted, a first output neuron for outputting a positive signal only if the input speech data sequence matches with speech data sequence to be recognized, and a second output neuron for outputting a negative signal only if the input speech data sequence does not match with the speech data sequence to be recognized.

The function F(X) in foregoing equations may be a sigmoid function.

Alternatively, the function F(X) in foregoing equations may be a threshold function.

Each dynamic neuron may receive, as the input data Zj, data fed back by multiplying the own neuron's output Y by a weight.

Also, each dynamic neuron may receive, as the input data Zj, another neuron's output multiplied by a weight.

Furthermore, each dynamic neuron may receive, as the input data Zj, desired data given from outside.

DETAILED DESCRIPTION

Preferred embodiments of this invention will now be described in detail with reference to the accompanying drawings.

First Embodiment

Figure 1:
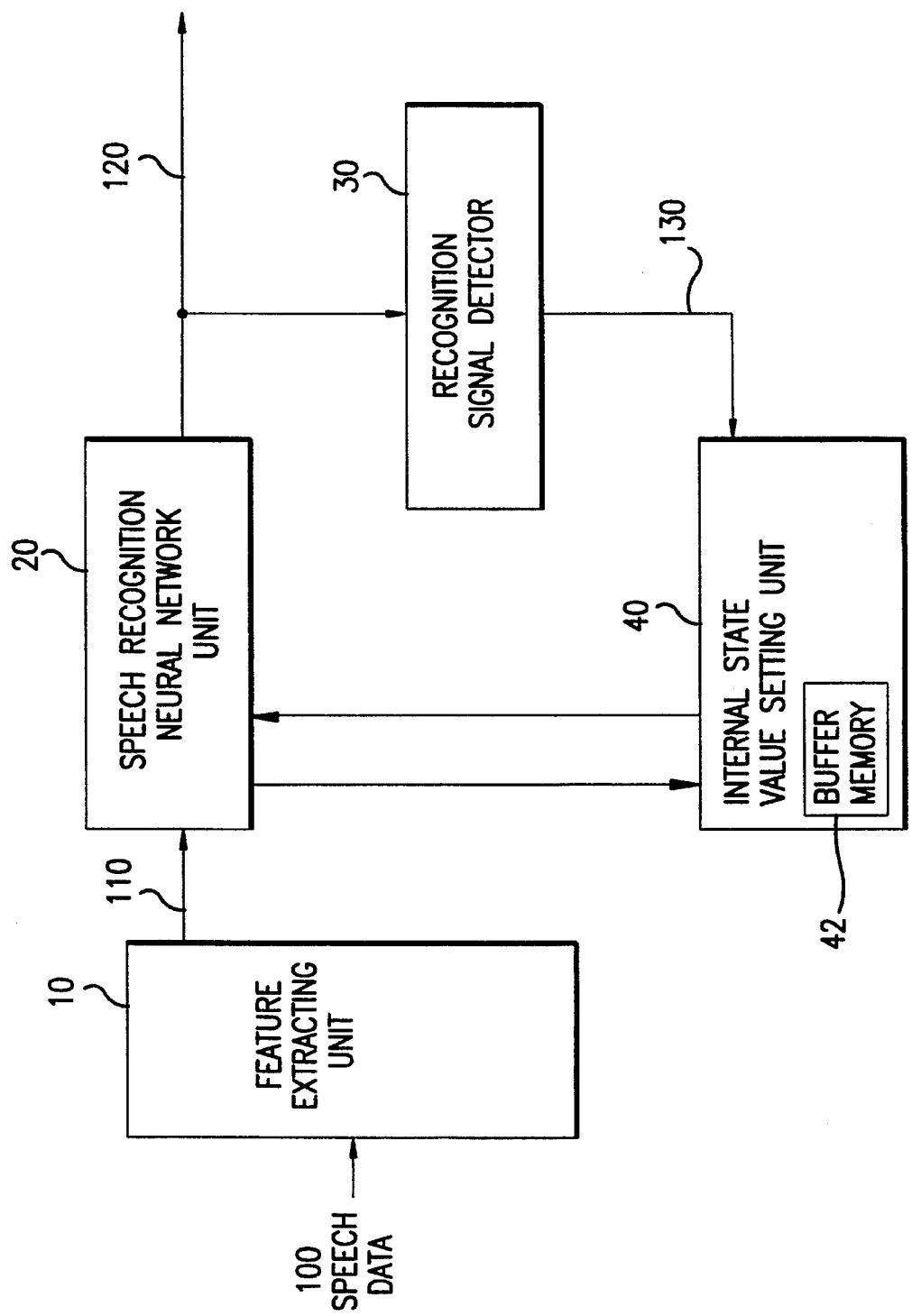
FIG. 1 is a block, diagram showing a speech recognition apparatus according to a first embodiment of this invention.

FIG. 1 shows a speech recognition apparatus according to a first embodiment of the invention.

Whole Structure of Speech Recognition Apparatus

The speech recognition apparatus of this embodiment comprises a feature extracting unit 10, a speech recognition neural network unit 20, a recognition signal detecting unit 30, and an internal state value setting unit 40.

Figures 2A, 2B, 2C:
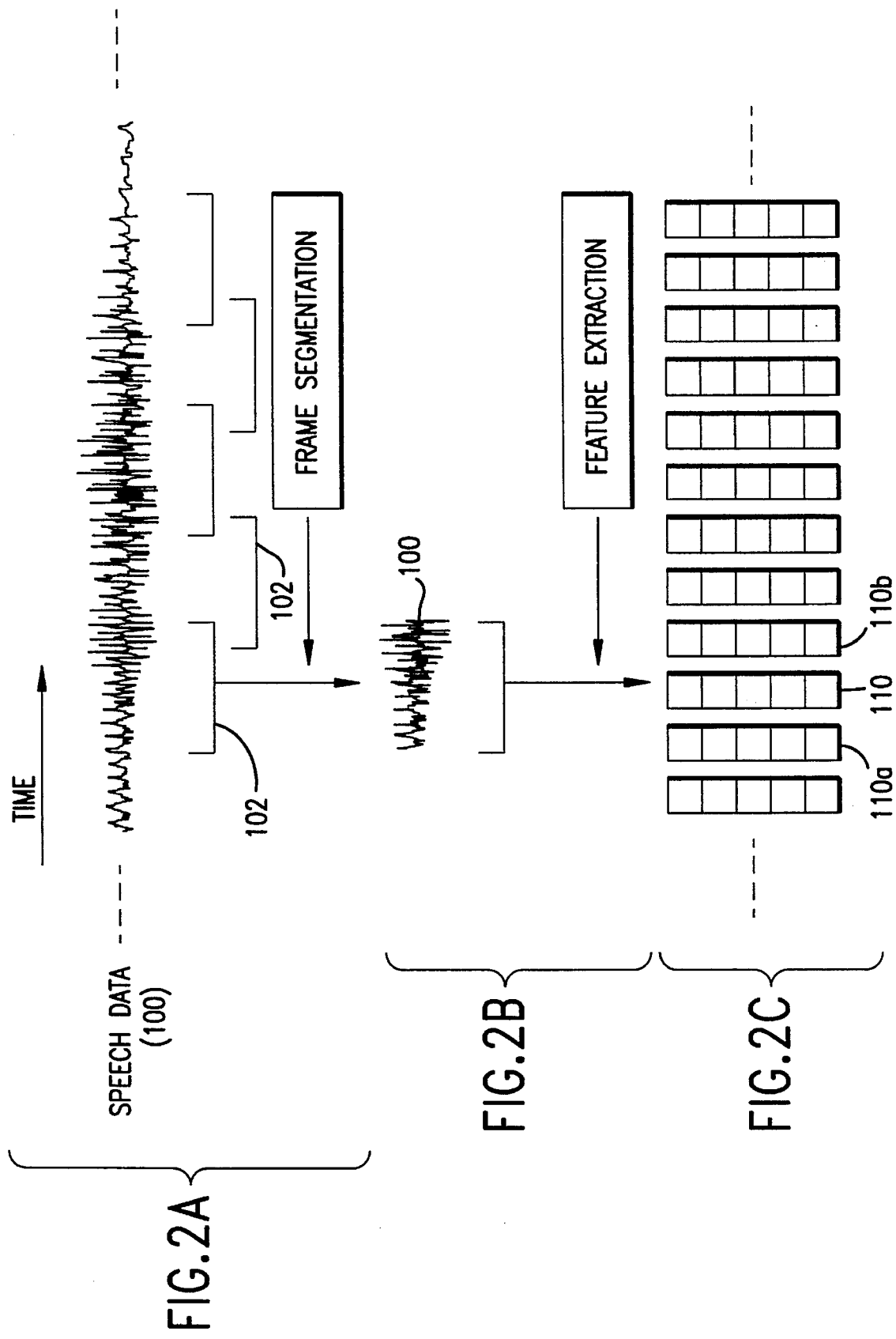
FIGS. 2A through 2C show the converting process to take place in a feature extracting unit shown in FIG. 1.

The feature extracting unit 10, as shown in FIG. 2A–2C, segments input speech data sequence 100 in units of frames, converts the frames of the speech data sequence 100 into feature vectors 110 and outputs the feature vectors 110 to the speech recognition neural network unit 20. The feature vectors 110 are obtained as follows. As shown in FIG. 2A, the speech data sequence is segmentd successively in units of predetermined frames 102. Then, as shown in FIG. 2B, features of the successive frames of speech data sequence 100 are extracted, by such means as linear predictive coding and filter bank and are then outputted to the speech recognition neural network unit 20 as a series of feature vectors 110.

The speech recognition neural network unit 20 learns predetermined speech data sequence for preparation to recognize the same data. The neural network unit 20 takes a speech recognition action, namely, discriminates whether or not the speech data sequence to be inputted as feature vectors 110 match with recognition object speech data sequence. If they match, the neural network unit 20 will output a speech recognition signal 120. The neural network unit 20 will be described below in greater detail.

The recognition signal detecting unit 30 detects the speech recognition signal 120 to be outputted from the neural network unit 20 and outputs a reset instruction signal 130 to the internal state value setting unit 40 upon detection of each speech recognition signal 120.

In the internal state value setting unit 40, an initial value of the internal state value of the neural network unit 20 is preset. When the reset instruction signal 130 is inputted to it, the initial state value setting unit 130 resets the neural network unit 20 so that its internal state value will be set to the initial value.

With this arrangement, the neural network unit 20 discriminates whether or not the input speech data sequence match with recognition object speech data sequence and resets upon output of each speech recognition signal 120 to start the next speech recognition action. Therefore, even when identical speech data sequence "A", for example, to be an recognition object is successively inputted, accurate recognition can be achieved for every input data. As a result, it is possible not only to recognize the speech data sequence "A" accurately, but also to detect the frequency of consecutive inputting in the case where the speech data sequence "A" is successively inputted.

In this embodiment, the internal state value setting unit 40 includes a buffer memory 42 in which the initial value is set. The initial value is used in setting the internal state value of the neural network unit 20. The manner of setting the internal state value will be described below in detail.

The neural network unit 20 to be used in this invention may be a conventional static neural network represented by, for example, a hierarchical model or a Markov mode. For achieving a better recognition with a simple construction, it is preferable to use following dynamic neural network.

Composition of Speech Recognition Neural Network

Figure 3:
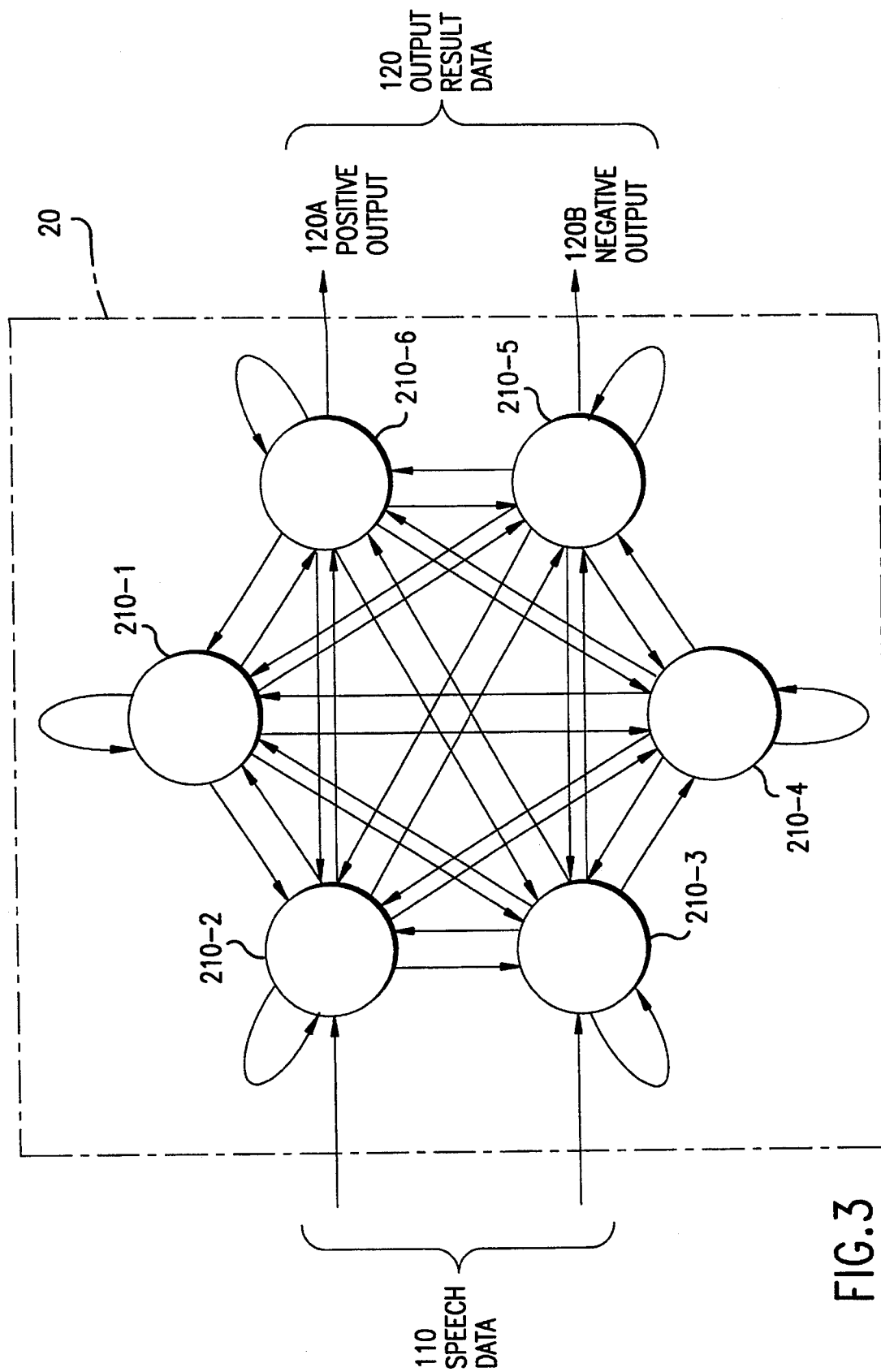
FIG. 3 is a schematic view showing a neural network unit of the first embodiment.

FIG. 3 schematically shows one example of dynamic neural network to be used as the speech recognition neural network unit 20. The neural network unit 20 is composed of a plurality of interconnected neurons 210-1, 210-2, ... 210-6 constituting neurons. The connection of the individual neurons 210 are equipped with respective weights each variable in strength. By varying this weight to a proper value by learning, accurate speech recognition will take place. The learning will be described below in detail.

Now, the feature vectors 110 of the speech data sequence 100 are outputted to the neurons 210-2 and 210-3, and a speech recognition signal 120 is outputted from the neurons 210-5 and 210-6. In this embodiment, as the speech recognition signal 120, a negative output 120-B and a positive output 120-A are outputted from the neurons 210-5 and 210-6, respectively.

Construction of Neuron

Figure 4:
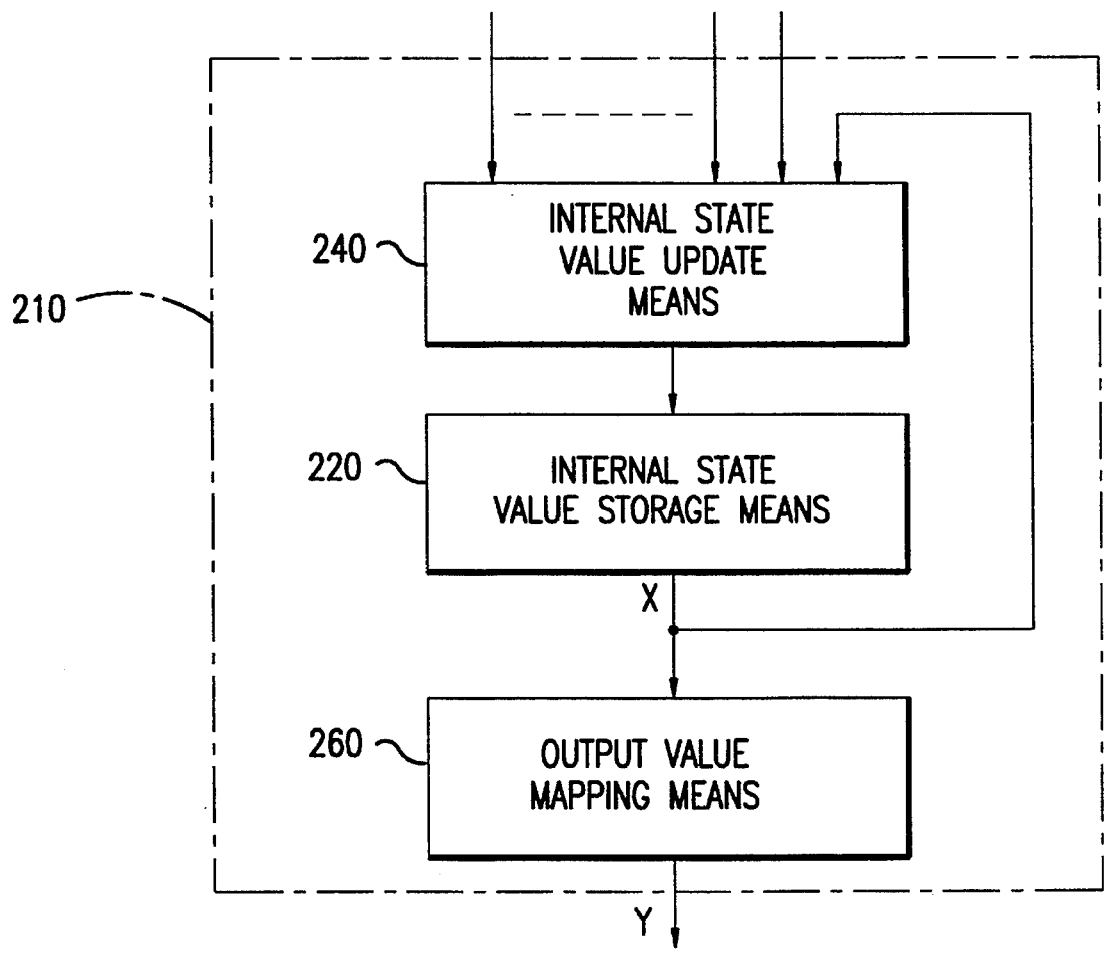
FIG. 4 shows one of neurons constituting the neural network unit of the first embodiment.

FIG. 4 schematically shows the construction of the individual neuron 210. The neuron 210 includes an internal state value storage means 220 for storing an internal state value X, an internal state value update means 240 for updating the internal state value X of the internal state value storage means 220 using the internal state value X and an external input value Zj (described below) as inputs, and an output value generating means 260 for converting the internal state value X into an external output Y.

Thus, in the neural network unit 20 used in this embodiment, the internal state value X of the neuron 210 is consecutively updated based on the value X itself. Therefore, the history of the data inputted to the neuron 210 is converted and preserved as the internal state value X. Namely, as the internal state value X, the temporal history of input data is preserved and is reflected in the output Y. In this sense, the action of the neuron 210 of this embodiment is dynamic. Therefore, unlike the network using the conventional static neurons, the neural network unit 20 of the embodiment can process time series data, without depending on the structure and the like of the neural network, thus reducing the whole circuit scale.

Figure 5:
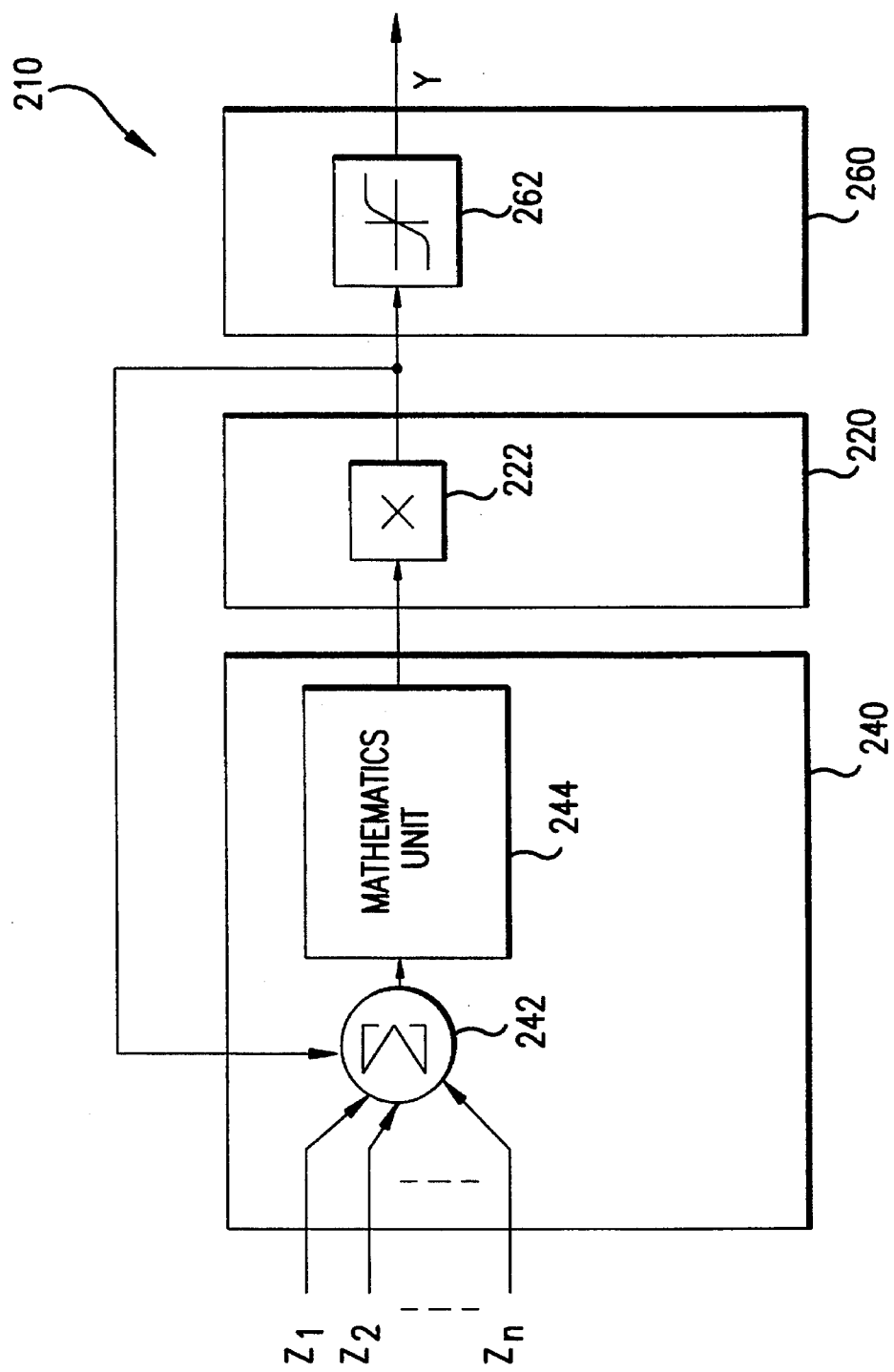
FIG. 5 shows the specific construction of the individual neuron of FIG. 4.

FIG. 5 schematically shows a specific example of the neuron 210. The internal state storage means 220 includes a memory 222 for storing the internal state value X. The internal state value update means 240 includes an input Zj accumulating means 242, and an mathematics unit 244 for performing an mathematical operation shown in the following formula to obtain a new internal state value X to update the content of the memory 222.

$$\tau \frac{d}{dt} X = -X + \sum_{j=1}^{n} Z_j \qquad \text{[Formula 18]}$$

The output value creating means 260 includes an mathematics unit 262. The mathematics unit 262 is designed so as to convert the internal state value X, which is stored in the memory 222, into the output value Y, whose region is restricted, using, for example, a sigmoid (logistic) function.

In the respective temporal change of the internal state value X and the output value Y, assuming that Xcurr is the current internal state value, Xnext is the update internal state value, and Zj (j=1 to n where n is an external input number to the neuron) is the external input value at the update action time point, the action of the internal state update means 240 can be expressed by the following equation using a function G.

Xnext=G(Xcurr, Z1 ..., Zi, ..., Zn).

Various alternative forms may be suggested for express the action of the internal state update means 240; for example, it may be expressed by above-mentioned Formula 13 using a first-order differential equation where τ is a constant.

As a slightly modified form of Formula 13, it may be expressed by the following formula.

$$\tau \frac{d}{dt} X_i = -X_i + \sum_{j=1}^{n} W_{ij} Y_j + D_i + \theta_i \qquad \text{[Formula 14]}$$

where Wij is the connection strength in connecting the output of j-th neuron to the input of i-th neuron, Di is the external input value, and θi is the bias value. This bias value may be regarded as a connection with a fixed value as included in Wij.

Assuming that the internal state of the neuron 210 at an time is X and the action of the output synthesis means 260 is represented by a function F, the output Y of the neuron 210 can be expressed by the following equation:

Y=F(X).

F is exemplified by a sigmoid (logistic) function of a positive-negative symmetric output as shown in the following formula:

$$Y = \frac{2}{1 + \exp(-X)} - 1 \qquad \text{[Formula 15]}$$

But the function expression should by no means be limited to this specific example and may be a simple linear mapping function, a threshold function, etc.

Figure 6:
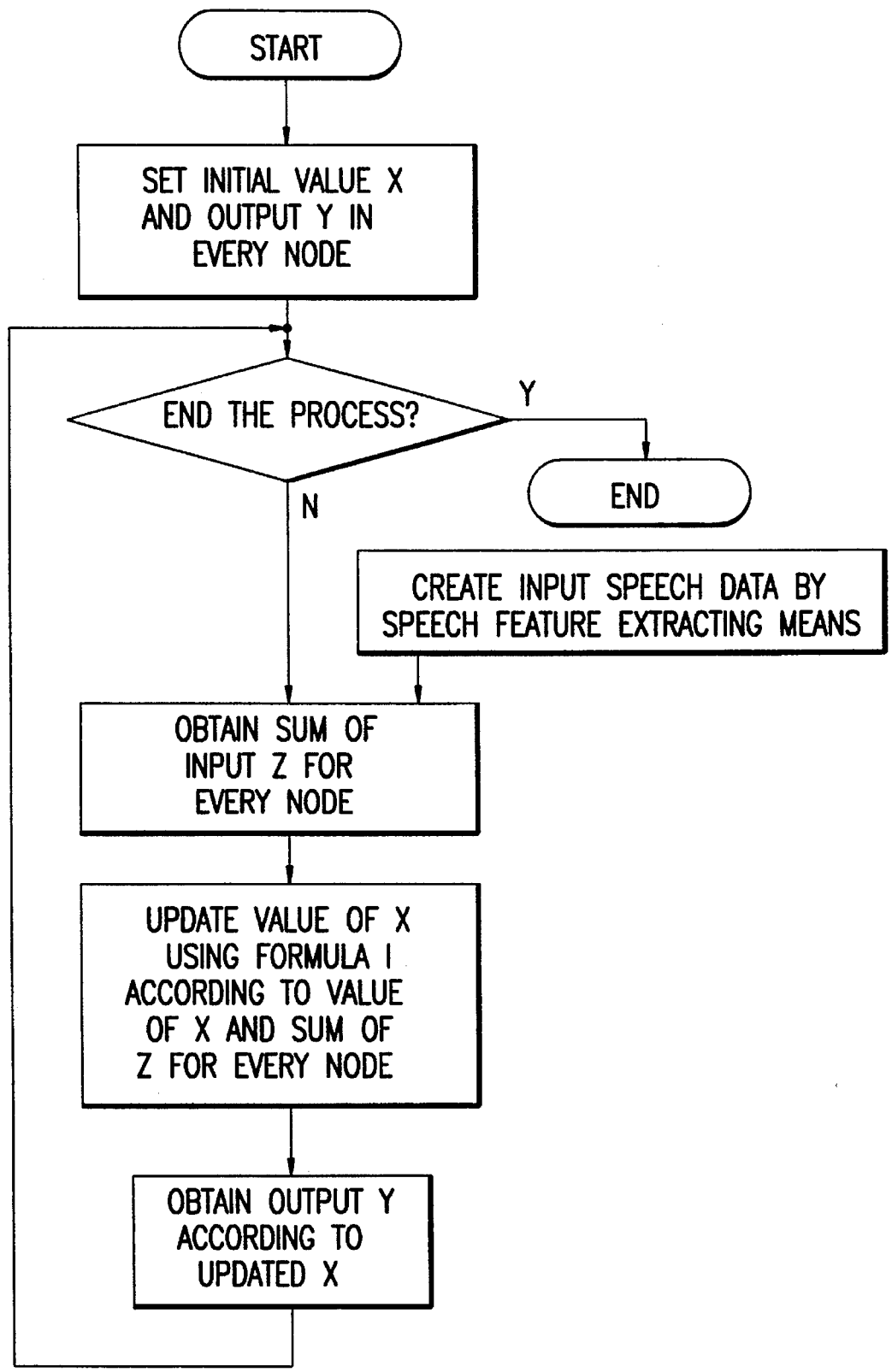
FIG. 6 is a flow diagram showing the operation of the neurons of the first embodiment.

Using the foregoing mathematical formulae, the time series of the output Y of the dynamic neuron 210 of this embodiment is calculated by the process shown in FIG. 6. In FIG. 6, the neuron is called "node".

The input Zj to the neuron 210 is exemplified by the output of the own neuron multiplied by a connection weight, the output of another neuron multiplied by a connection weight or the external input from an element or part other than the neural network.

In this embodiment, as shown in FIG. 3, to the neurons 210-2 and 210-3, the weighted output of the own neuron and the weighted output from another neuron are given. To the neurons 210-4, 210-5 and 210-6, the weighted output of the own neuron and the weighted output of another neuron are given.

Initialization of Internal State Value

The internal state value setting of the neuron 210 to an initial value will now be described.

Each neuron 210 is designed so as to update the internal state value X, which is stored in the internal state value storage means 220 as mentioned above, successively by the internal state value update means 240. Therefore, in the neural network unit 20 using such neurons 210, before it takes action, or each time a reset instruction signal 130 is outputted from the recognition signal detecting unit 30, it is necessary to set the initial value.

In the speech recognition apparatus of FIG. 1, before the neural network unit 20 takes action, or each time a reset instruction signal 130 is outputted from the recognition signal detecting unit 30, the internal state value setting unit 40 resets the neural network unit 20 to set in every neuron 210 a suitably selected initial internal state value X as an initial value and to set there also the corresponding output Y. Given that the initial values have thus been set, the neural network unit 20 will take action quickly and stably.

Namely, as shown in Formulae 5 and 6, the action of the dynamic neuron 210 constituting the neural network unit 20 is expressed by a first-order differential equation. Therefore its initial value is necessary for deciding the action.

Figure 11:
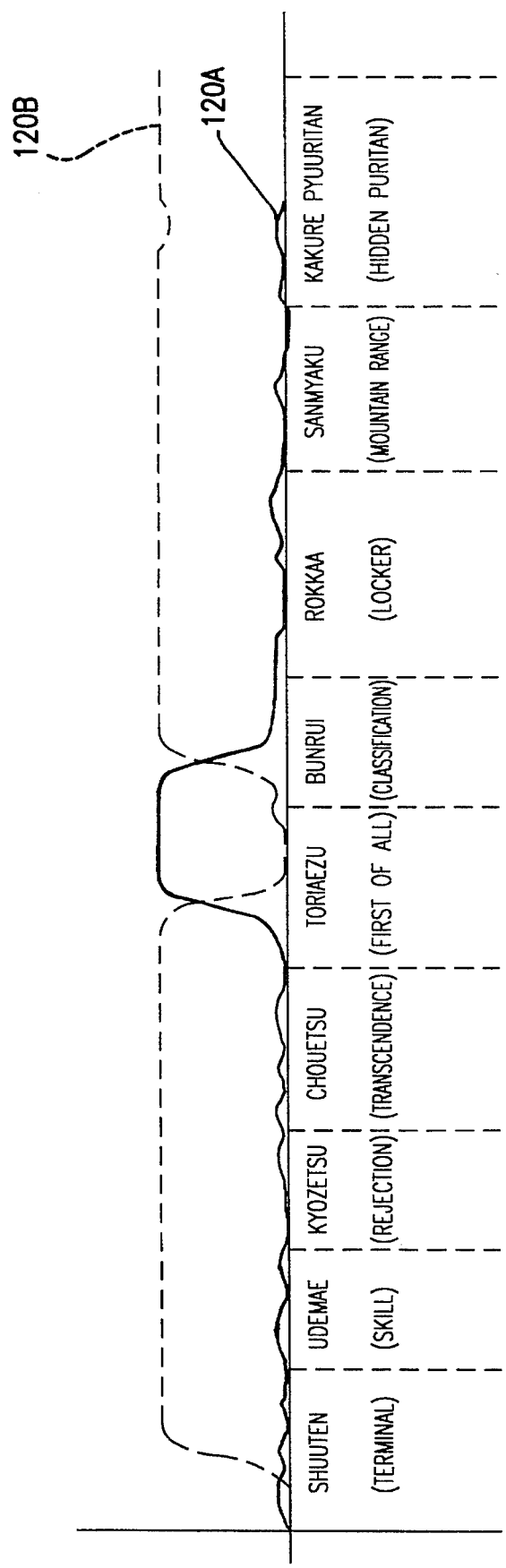
FIG. 11 shows one example of output of the speech recognition process.
Figure 12:
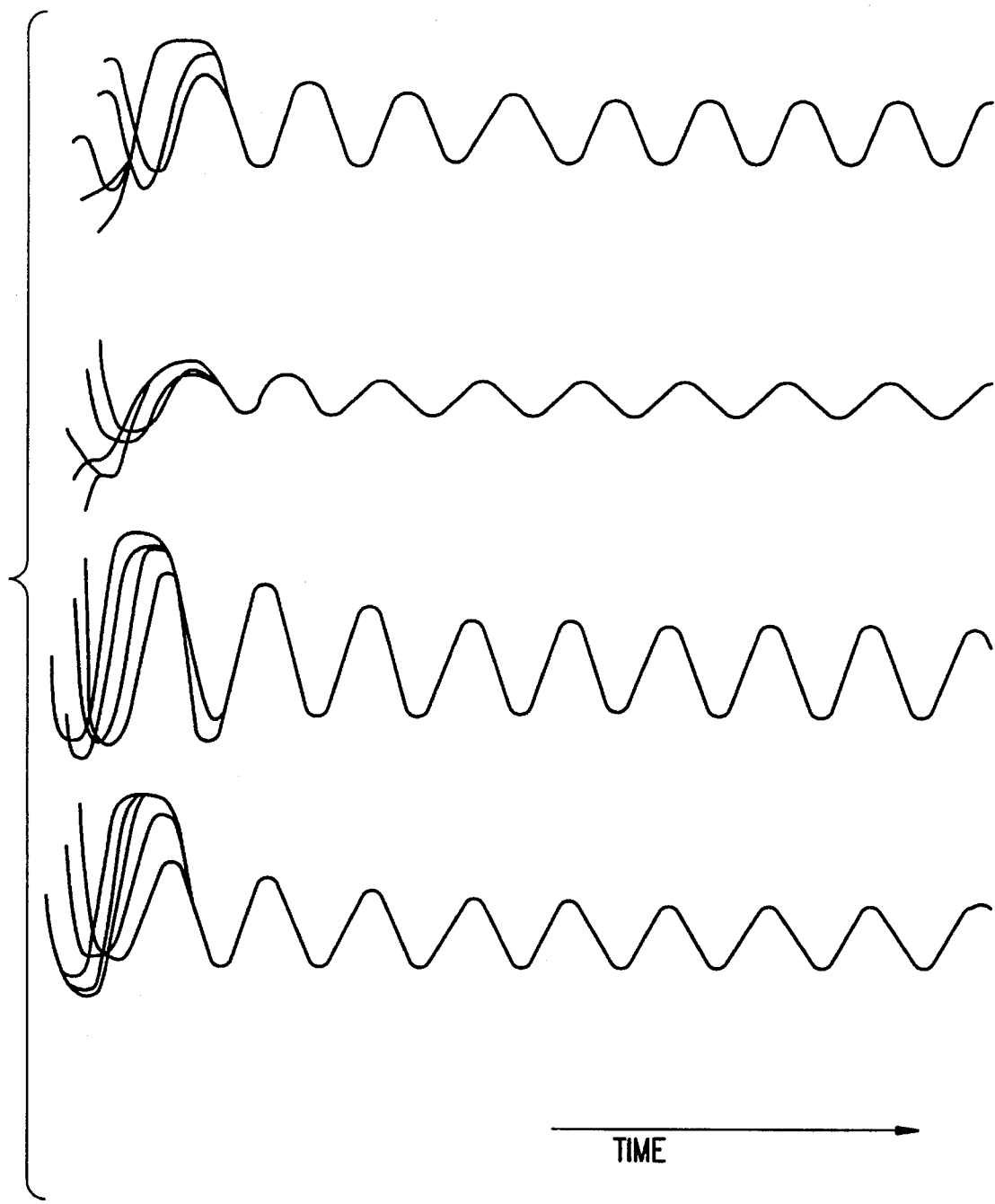
FIG. 12 is a diagram showing the stable state of the neural network unit of the first embodiment.

FIG. 11 shows the example in which various initial values, 5 sets of values in this case, were given to the respective neurons of the neural network unit 20 and then no data was inputted, illustrating temporal changes of outputs of four suitably selected neurons. As is apparent from FIG. 12, the neural network unit 20 brings it into a stable state with the lapse of a certain time. This stable state can be in a form of a limit-cycle state as shown in FIG. 12 or a simple stable point, depending on the number of neurons constituting the neural network unit 20, the frequency of learning and the learned data as well as the input data sequence.

Such stable state is an important factor to make the operation of the neural network unit 20 steady. Consequently, as the initial values for the operation of the neural network unit 20, the internal state value of the neural network 20 in any one of the stable state S: when no speech data sequence is inputted, when a suitable normal speech data sequence is inputted, and when background noises are inputted during actual speech recognition, should be stored in the buffer memory 42 of the internal state value setting unit 40. Then, using the initial values set in the buffer memory 42, the initial value of the initial state value of the neural network unit 20 should be set.

In this embodiment, the buffer memory 42 of the internal state value setting unit 40 is designed so as to store, as the initial value, the internal state value of the neural network unit 20 in a stable state during actual recognition when background noises are inputted. Namely, inside the internal state value setting unit 40, a discriminator is mounted for judging whether or not the neural network unit 20 is in a stable state when background noises are inputted. Each time a reset instruction signal 130 is inputted, the internal state value setting unit 40 resets the neural network unit 20 to set the internal state value to the initial value read from the buffer memory 42. Then when the neural network unit 20 is settled down in a newly stable state, the internal state value setting unit 40 sets in the buffer memory 42 the internal value of the neural network unit 20 as renewed initial value.

Thus with the speech recognition apparatus of this embodiment, since the neural network unit 20 is operated using the internal state value in the latest stable state as the initial value, it is possible to perform speech recognition of the input data 100 more stably and accurately.

Learning of Neural Network

The learning method of the neural network unit 20 for speech recognition will now be described.

Figure 7:
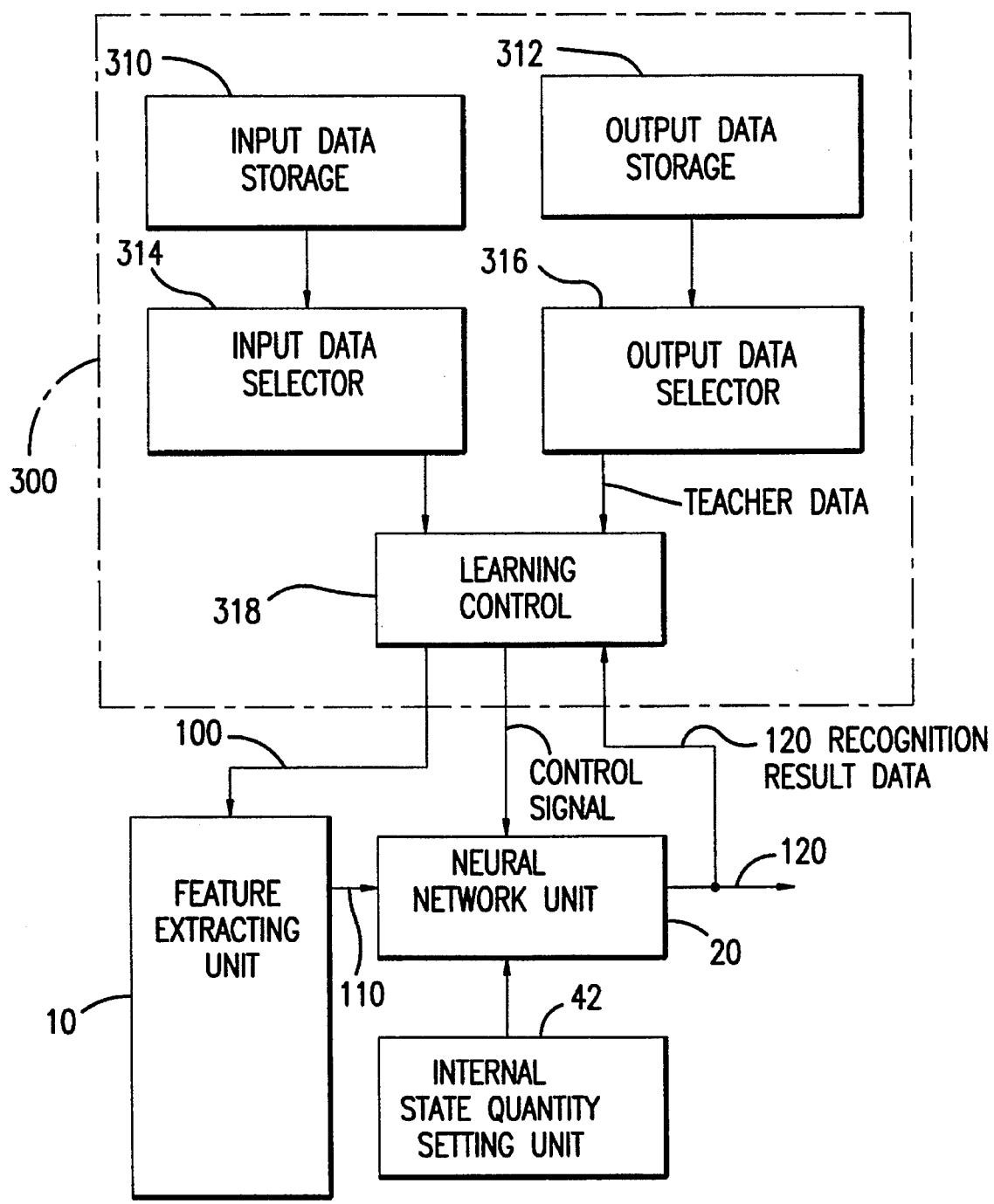
FIG. 7 shows a learning unit to be used for rendering the neural network unit of the first embodiment to learn.
Figure 8A:
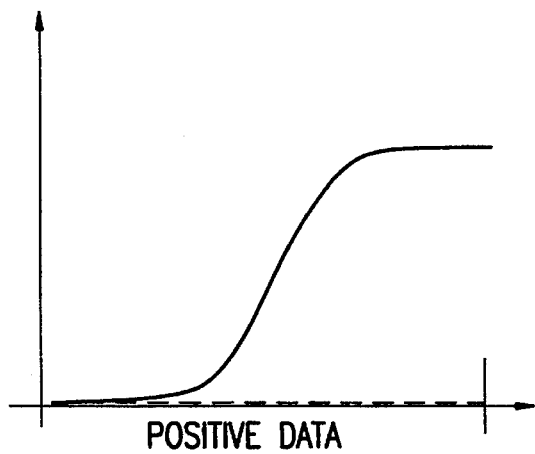
FIGS. 8A and 8B show one example of way of learning.
Figure 8B:
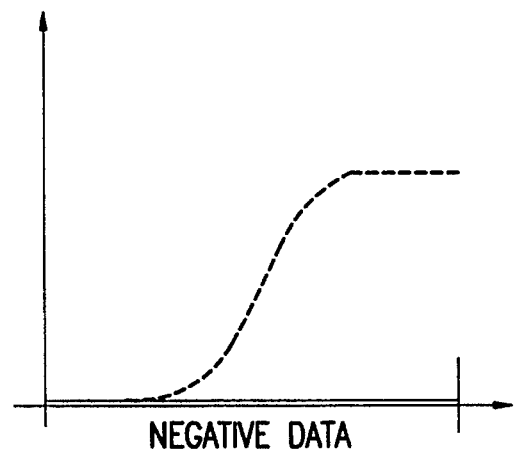

FIG. 7 shows the construction of a learning unit 300 for rendering the neural network unit 20 to make learning.

The learning unit 300 includes an input data storage device 310 in which input speech data sequence for learning is stored, an output data storage device 312 in which standard output data corresponding to the input speech data sequence is stored, an input data selector 314 for selecting input data to be learned, an output data selector 316 for selecting output data, and a learning controller 318 for controlling the learning process of the neural network unit 20.

When carrying out the learning method by the learning unit 300, firstly initial values X are set in all neurons 210 constituting the neural network unit 20 which undergoes a learning process. Then, speech data sequence to be learned is selected by the input data selector 310 and is inputted to the learning controller 318. At that time, learning output data corresponding the selected learning input data is selected by the output data selector 316 and is inputted to the learning controller 318. The selected learning input speech data sequence is inputted to the feature extracting unit 10 where the feature vectors 110 are extracted and are outputted to the neural network unit 20 as an external input. For every neuron 210, the sum of the respective inputs Zj is obtained to update the respective internal state value X. Then, the output Y of the neuron 210 is obtained from the updated X.

To the interneuron connection strength of the neural network unit 20 in the initial state, a random value is given. Therefore, the recognition results 120B and 120A outputted from the individual neurons 210-5 and 210-6 of FIG. 3 are random values. In order to correct these output, the weight between the neurons is modified.

If recognition object speech data sequence is inputted to the neural network unit 20 as the learning object, learning is made in such a manner that a high level signal as a positive output 120A will be outputted from the neuron 210-6 while a low level signal as a negative output 120B will be outputted from the neuron 210-5. The purpose of outputting two kinds of recognition result data 120A and 120B, i.e. the positive output and negative output, is to improve the accuracy of speech recognition process.

The speech data sequence 100 to be recognized is inputted repeatedly to vary the weight between the neurons; little by little so that a more correct value will be outputted from the neurons 210-5 and 210-6. For input speech data sequence is data not to be recognized, the weight between the neurons should be varied in such a manner that the positive output 120A will be a low level while the negative output will be a high level.

The foregoing learning method is exemplified by a learning rule using the value C to be introduced by the following formula:

$$\tau \frac{d}{dt} C = C + \Sigma_j E_j \quad \text{[Formula 16]}$$

where C is a learning evaluation value and E is an error evaluation function.

The error evaluation function E can be exemplified by, the Kullback-leibler distance expressed by the following formula:

$$E(Y, T) = T\log\left(\frac{T}{Y}\right) + (1-T)\log\left(\frac{1-T}{1-Y}\right) \quad \text{[Formula 17]}$$

where Y is an actual output value and T is a desired output value.

If the range of output value is from −1 to 1, the function E, substantially equivalent to Formula 17, will be as follows:

$$E(Y, T) = \left(\frac{1-T}{2}\right)\log\left(\frac{1-T}{1-Y}\right) + \left(\frac{1+T}{2}\right)\log\left(\frac{1+T}{1+Y}\right) \quad \text{[Formula 18]}$$

If thus assumed, Formula 16 can be rewritten specifically as follows:

$$\tau \frac{d}{dt} C_i = C_i - \Sigma_j W_{ij} C_j (1 - Y_i^2) + (Y_i - T_i) \quad \text{[Formula 19]}$$

As a result, the update rule for the connection strength of various external input is given by the following formula:

$$\Delta W_{ij} = -\alpha \int C_i Y_j \, dt \quad \text{[Formula 20]}$$

Figure 9A:
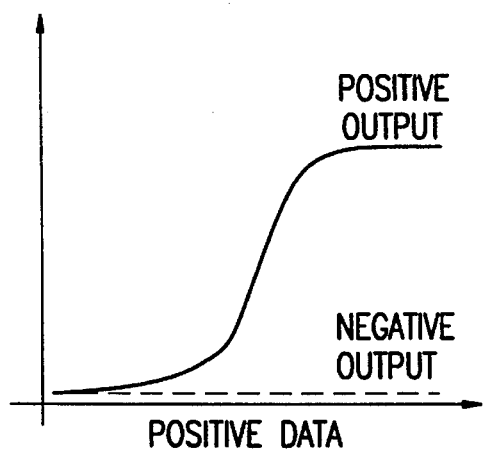
FIGS. 9A and 9B show another example of way of learning.
Figure 9B:
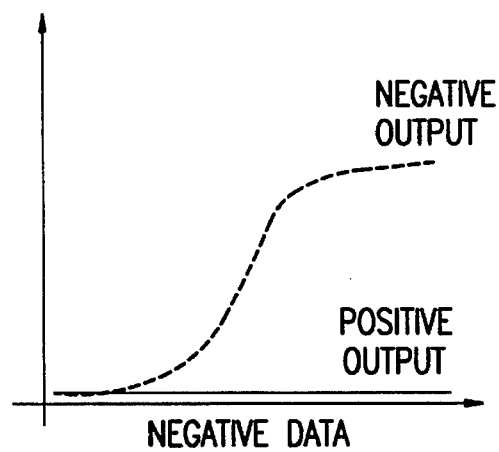

Learning using the foregoing procedure is repeated until the output of the neural network unit 20 converges. The number of times of learning is about several thousands times. Alternatively, two pieces of speech data sequence may be successively inputted to learn. In the learning using speech data sequence one by one, the positive output after once became high level will not go down to low level, and the negative output after once become low level will not go up to high level. Specifically, in the learning using speech data sequence one by one, as shown in FIG. 9A, speech data sequence to be recognized (hereinafter called "positive data") is given to raise the positive output to high level (in this case, the negative output is kept low level). Or as shown in FIG. 9B, data not to be recognized (hereinafter called "negative data") is given to raise the negative output to high level (in this case, the positive output is kept low level). A problem with this learning is that for either the positive output or the negative output, after it has once been raised to high level, it will not go down to low level.

Therefore, if a plurality of pieces of speech data sequence containing positive data and negative data in a mixed form are given successively, the positive output once raised to high level when positive data was inputted will not be lowered to low level even when negative data is inputted. The same can be said for the negative output.

Figure 10A:
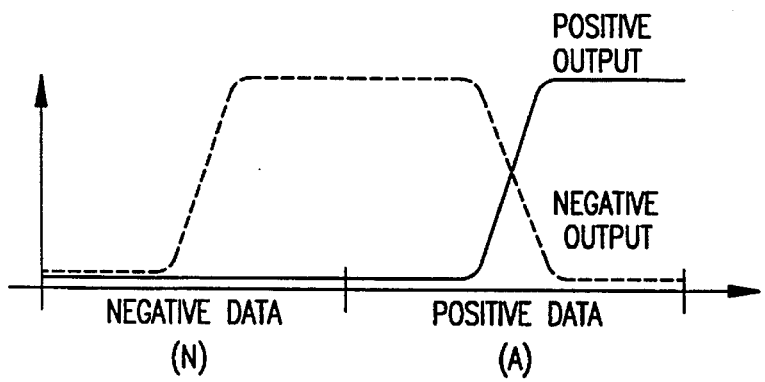
FIGS. 10A through 10D show still another example of way of learning.
Figure 10B:
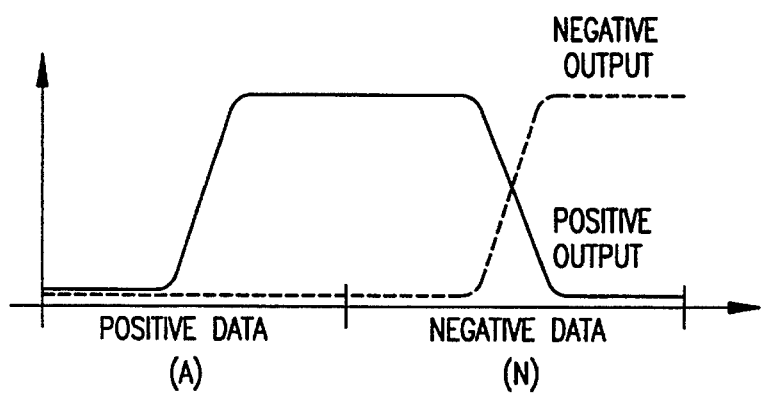
Figure 10C:
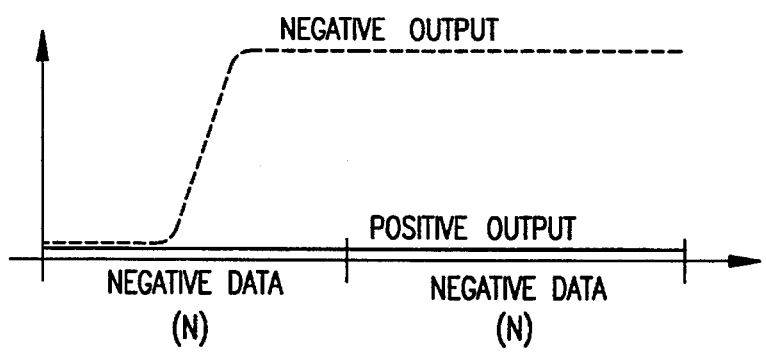
Figure 10D:
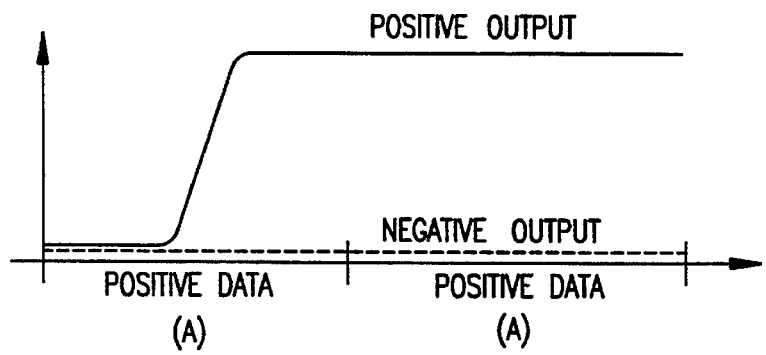

In this embodiment, as shown in FIGS. 10A through 10D, two pieces of speech data sequence are given successively to learn to raise and to lower the respective outputs. In FIG. 10A, negative data N and positive data A are repeatedly inputted to perform learning. By this learning, it is possible to learn the raising of the positive output and the raising and lowering of the negative output. In FIG. 10B, the positive data A and the negative data N are repeatedly inputted to perform learning. By this learning, it is possible to learn the raising and lowering of the positive output and the raising of the negative output. In FIG. 10C, negative data N is repeatedly inputted to perform learning. This learning is to render the neural network unit 20 not to have misrecognition, by the learning of FIG. 10B, that the data next to the negative data N is positive data A. Likewise, in FIG. 10D, two pieces of positive data A are repeatedly inputted to perform learning. This learning also is to render the neural network unit 20 not to have misrecognition, by the learning of FIG. 1.0A, that the data next to the positive data A is the negative data N.

The foregoing learning is performed for neural network unit 20 of FIG. 1.

FIG. 11 shows test data obtained when actual speech recognition took place using the speech recognition apparatus of this embodiment. The neural network unit 20 used in this test is composed of 20 input neurons, two output neurons and 32 other neurons. 20-dimentional LPC cepstrum was given to the neural network unit 20 from the feature extracting unit 10, and data outputted from the neural network unit 20 was measured.

In FIG. 11, 120A and 120B designate the positive output and negative output, respectively, of the neural network unit 20.

In this test, a single word "TORIAEZU" (FIRST OF ALL) as positive recognition object data and eight wards, i.e., "SHUUTEN" (TERMINAL), "UDEMAE" (SKILL), "KYOZETSU" (REJECTION), "CHOUETSU" (TRANSCENDENCE), "BUNRUI" (CLASSIFICATION), "ROKKAA" (LOCKER), "SANMYAKU" (MOUNTAIN RANGE) and "KAKURE PYURITAN" (HIDDEN PURITAN) as negative recognition object data were given to the neural network unit 20. The neural network unit 20 was previously rendered to learn in such a manner that if positive recognition object data was given, the positive output 120A and the negative output 120B would vary when up to half of the object data was inputted. In FIG. 11, the Y coordinate represents the output value of the output neuron while the X coordinate represents the flow of time from left to right.

As shown by the test data of FIG. 11, when the speaker's speech data sequence was recognized by the speech recognition apparatus which was previously rendered to learn, the positive output 120A varied to a large value in response to the input of the word "TORIAEZU". And the negative output 120B varied to a small value. It turned out from this fact that the neural network unit 20 had discriminated correctly.

The dynamic neural network unit 20 of this embodiment can express the temporal structure of the input speech data sequence 100 within the connection weight of the neuron 210 and the internal state value X described by a differential equation. Structure of the neural network will not restrict temporal structure of input data like MLP method of the conventional art. Therefore it is possible to deal with the input data 100 containing remarkably large temporal change.

Figure 13:
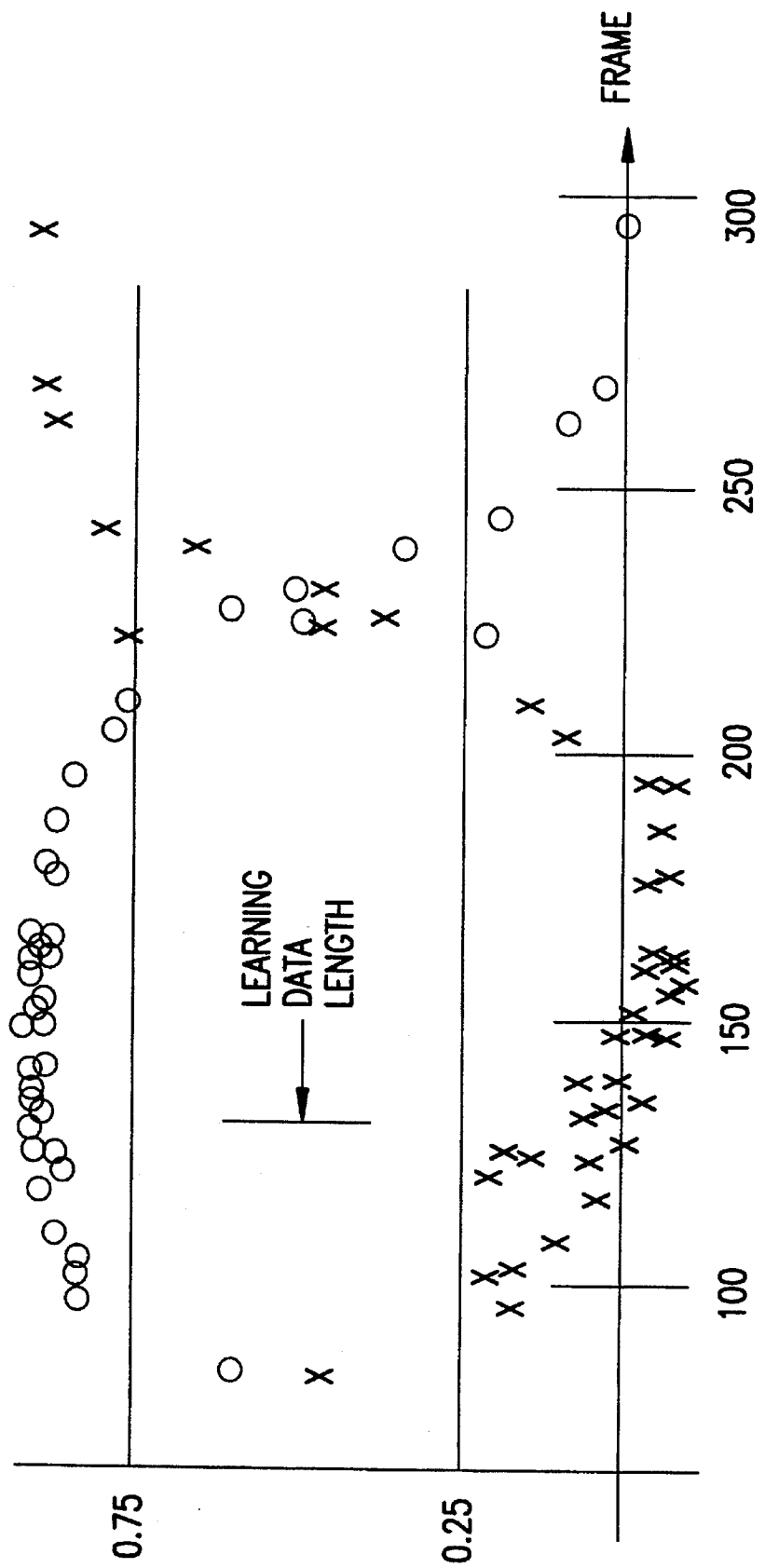
FIG. 13 shows one example of recognition ability, after learning, of the neural network unit of the first embodiment.

FIG. 13 shows the learning results of the neural network unit 20 which made learning using the input data of FIG. 10. The X coordinate represents input data length while the Y coordinate represents values of the positive output 120A and the negative output 120B. In FIG. 13, mark o designates the positive output 120A, and mark x designates the negative output 120B.

In this text, the neural network unit 20 which had made learning using the learning data of data length 131 was rendered to make speech recognition by changing the length of recognition object data. As a result, it turned out that data, whose length is a very wide range of 96 to 220, could be recognized accurately even though learning data used was a length of 131. It was confirmed that the input data 100 containing remarkably large temporal range could be recognized accurately by the neural network unit 20 of this embodiment.

Figure 14:
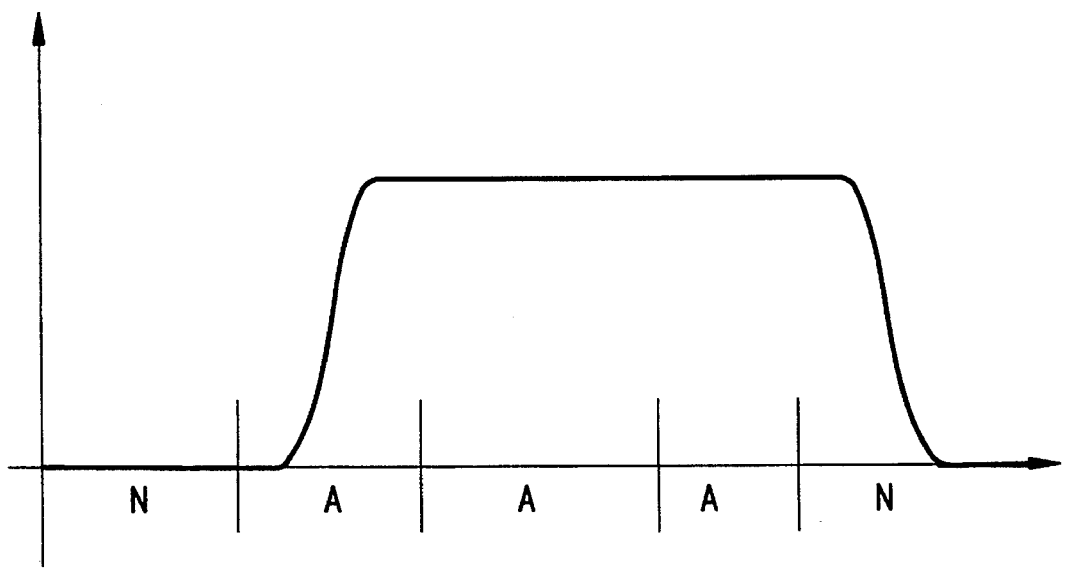
FIG. 14 shows one example of output of the neural network unit when consecutive identical recognition object is inputted.

With this neural network unit 20, which can perform excellent speech recognition, as shown in FIG. 14, when recognition object data A is successively inputted, it is impossible to accurately detect how many recognition object data A existed in the input data. Namely, when the recognition object data is successively inputted, the positive output 120A of the neural network portion 20 will be kept at high level so that it cannot be detected how many recognition object data A existed.

However, if the speech recognition apparatus is used to allow consecutive data of identical recognition object category, it is very important to detect how may recognition object data existed.

Figure 15:
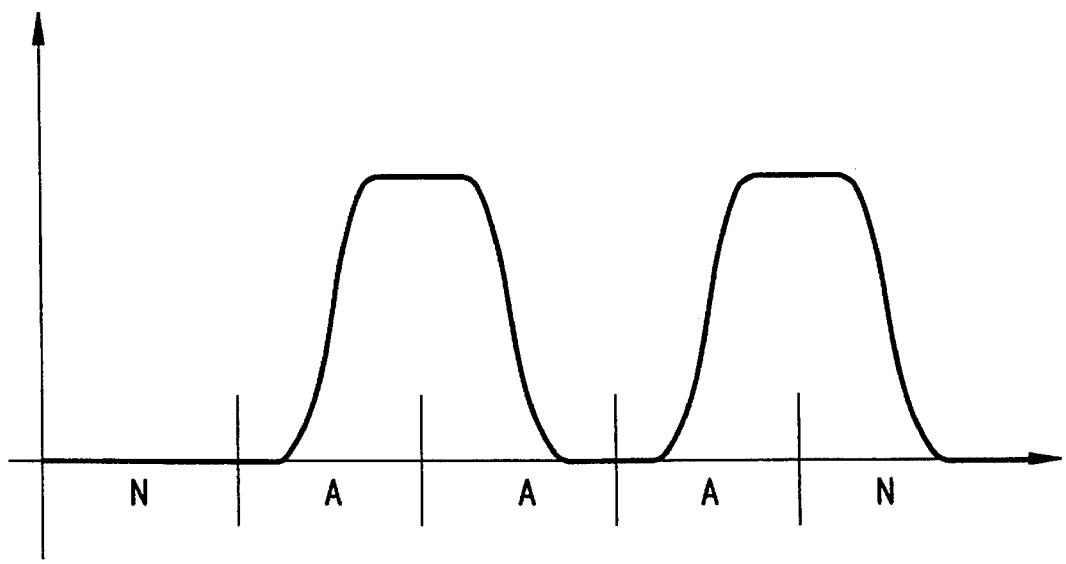
FIG. 15 shows another example of output of the neural network unit when consecutive identical recognition object data is inputted.

In order to avoid this problem, it might be possibe to arrange consecutive data of identical recognition object category not to be contained in learning data. In this case, it is relatively easy to learn and the flexibility of recognition ability will be maintained. As a matter of course, the response to the consecutive input of identical recognition object category will not be accurate. FIG. 15 shows such example, in which it is impossible to detect the second data A when three pieces of consecutive recognition object data A is inputted.

In order to solve such problem, the speech recognition apparatus of this embodiment comprises, as shown in FIG. 1, a recognition signal detecting unit 30 and an internal state value setting unit 40.

Figure 16:
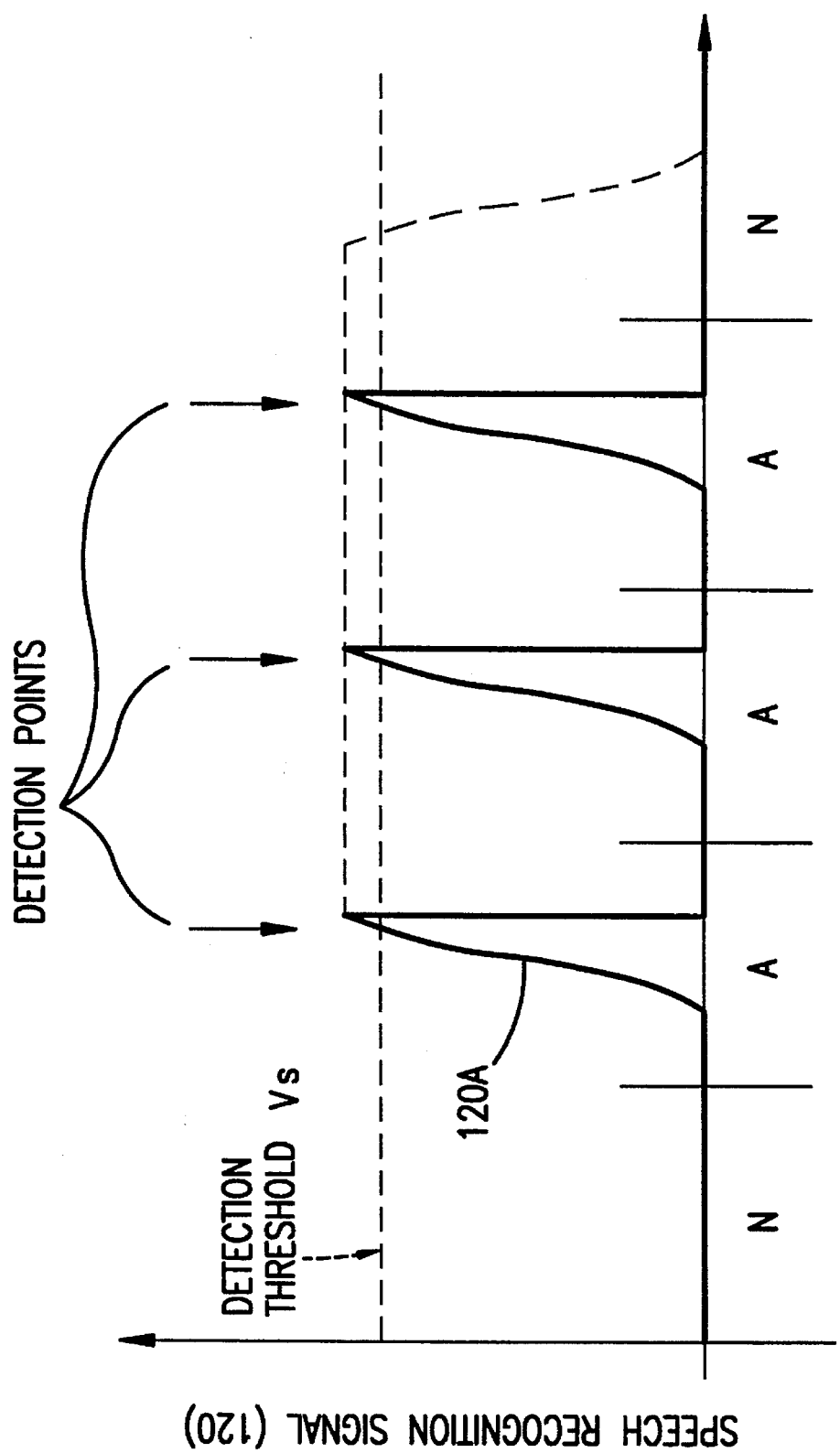
FIG. 16 shows one example of speech recognition signal to be outputted from the neural network unit of the first embodiment.

In the recognition signal detecting unit 30, a detection threshold value Vs is previously set, as shown in FIG. 16. The duration of time T0 during which the positive output 120A outputted from the neural network unit 20 exceeds the detection threshold Vs reaches a predetermined time duration, the recognition signal detecting unit 30 will judge that speech of recognition object data A has been recognized and then will output a reset instruction signal 130 to the internal state value setting unit 40.

Each time the reset instruction signal 130 is inputted, the internal state value setting unit 40 will reset the neural network unit 20 and will set the data stored in the buffer memory 42 to as an initial value.

In this way, the neural network unit 20 can recognize the speech data sequence A, which is to be successively inputted for the next time. As a result, it is possible to accurately detect how many recognition object data A existed in the input data 100, based on the speech recognition signal 120 outputted from the neural network unit 20.

Namely, if simply the speech recognition signal 120 of FIG. 14 is outputted from the neural network unit 20, it is impossible to detect how many recognition object data A existed in the input data. In this embodiment, using the recognition signal detecting unit 30 and the internal state value setting unit 40, the neural network unit 20 is designed so as to be initialized each time the positive output 120A of the neural network unit 20 exceeds the detection threshold Vs. Therefore, as shown in FIG. 16, it is possible to reliably detect the existence of the recognition object data A at the detection point, shown.

Figure 17:
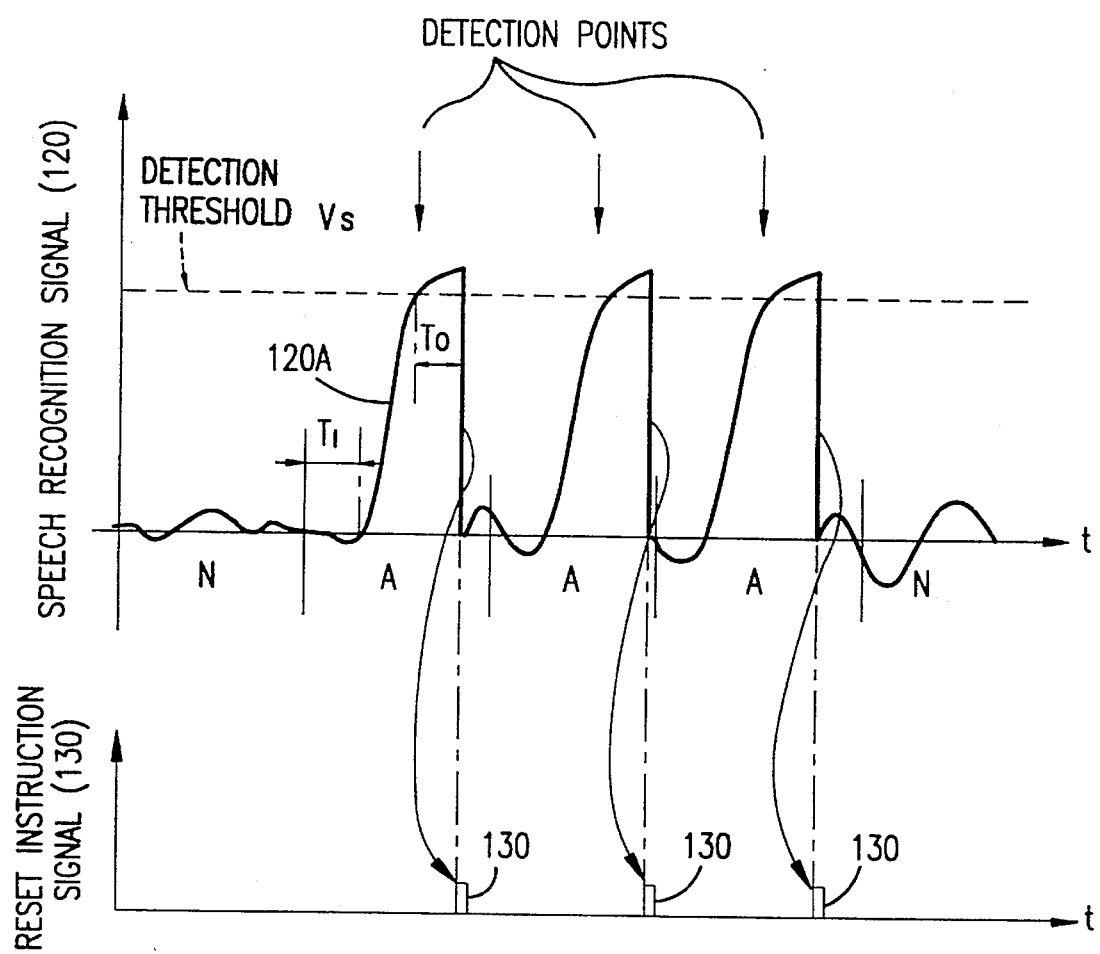
FIG. 17 shows one example of output to be obtained when actual data is inputted to the speech recognition apparatus of the first embodiment.

FIG. 17 shows the test results of speech recognition, for actual data, which was conducted using the speech recognition apparatus of this embodiment. In this test, recognition object data A was a single speech "TORIAEZU" (FIRST OF ALL) while the negative data N is a single speech "SHUUTEN" (TERMINAL). As is apparent from FIG. 17, the speech recognition apparatus of this embodiment can accurately recognize the data A "TORIAEZU" of consecutive recognition object category and can also accurately recognize the number of the consecutive data.

The recognition signal detecting unit 30 of this embodiment is designed so as to output a reset instruction signal 130 when the time duration while the positive output 120A exceeds the detection threshold Vs reaches a predetermined value T0. This time T0 should be set suitably according to the length of recognition object data A. Namely, if the time T0 is too short, the positive output 120A will be repeatedly outputted for the single data A. If the time T0 is too long, it will be impossible to recognize the next data A to be successively inputted. Therefore, T0 should be set to a suitable length according to the length of the recognition object data A.

Second Embodiment

A modified speech recognition apparatus according to a second embodiment of this invention will now be described in detail. The parts or elements similar to those of the first embodiment are designated by like reference numerals, and their description is omitted.

Figure 18:
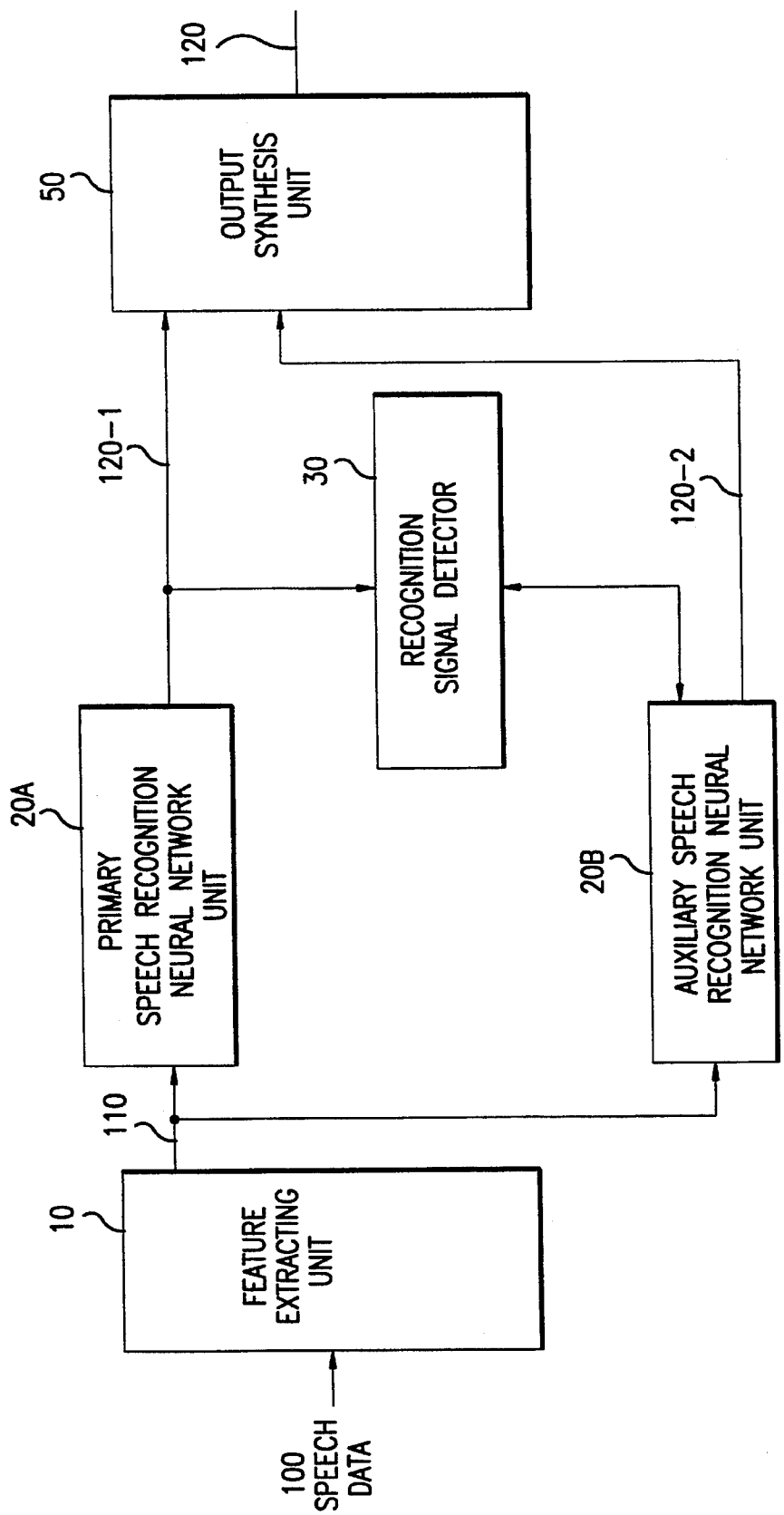
FIG. 18 is a block diagram showing a speech recognition apparatus according to a second embodiment of the invention.

FIG. 18 is a block diagram showing the speech recognition apparatus of this embodiment. The speech recognition apparatus comprises a feature extracting unit 10, a primary speech recognition neural network unit 20A, an auxiliary speech recognition neural network unit 20B, a recognition signal detecting unit 30, and an output synthesis unit 50.

Each speech recognition neural network unit 20A, 20B has the same construction as the neural network unit 20 of the first embodiment and has previously taken learning so as to recognize predetermined speech data sequence A.

The primary speech recognition network unit 20A, like the neural network unit 20 of the first embodiment, performs speech recognition based on the feature vectors 110 outputted from the feature extracting unit 10 and outputs a speech recognition signal 120 to the recognition signal detecting unit 30 and to the output synthesis unit 50.

Figure 19A:
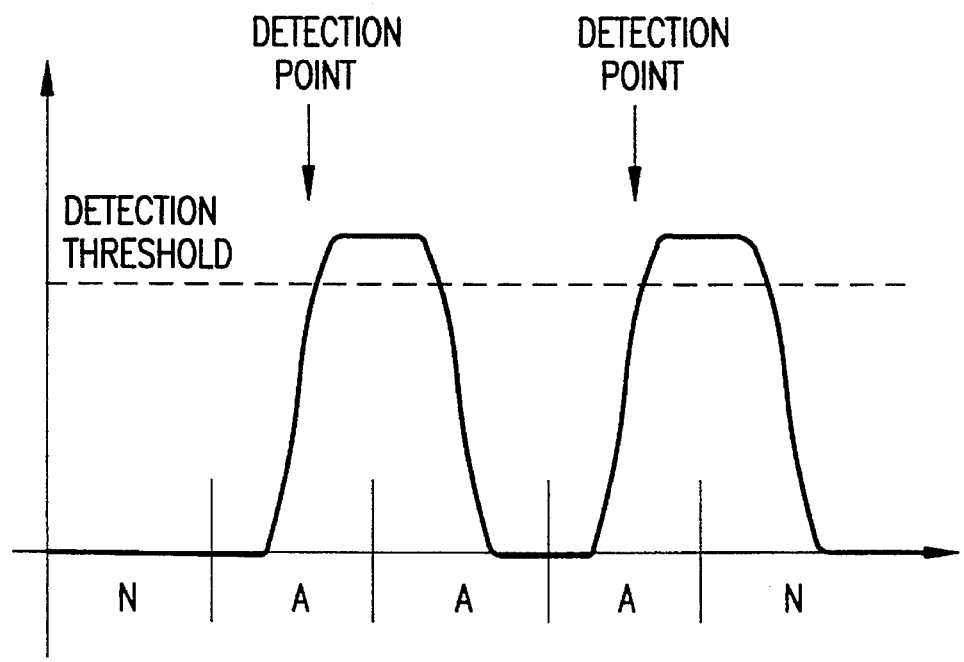
FIGS. 19A and 19B show the operation of the speech recognition apparatus of the second embodiment.

FIG. 19(A) shows one example of positive output 120-1 outputted from the neural network unit 20A.

When the positive output 120-1 outputted from the neural network unit 20A exceeds a predetermined detection threshold Vs for a predetermined period of time V0, the recognition signal detecting unit 30 outputs an action instruction signal to the auxiliary speech recognition neural network unit 20B.

Figure 19B:
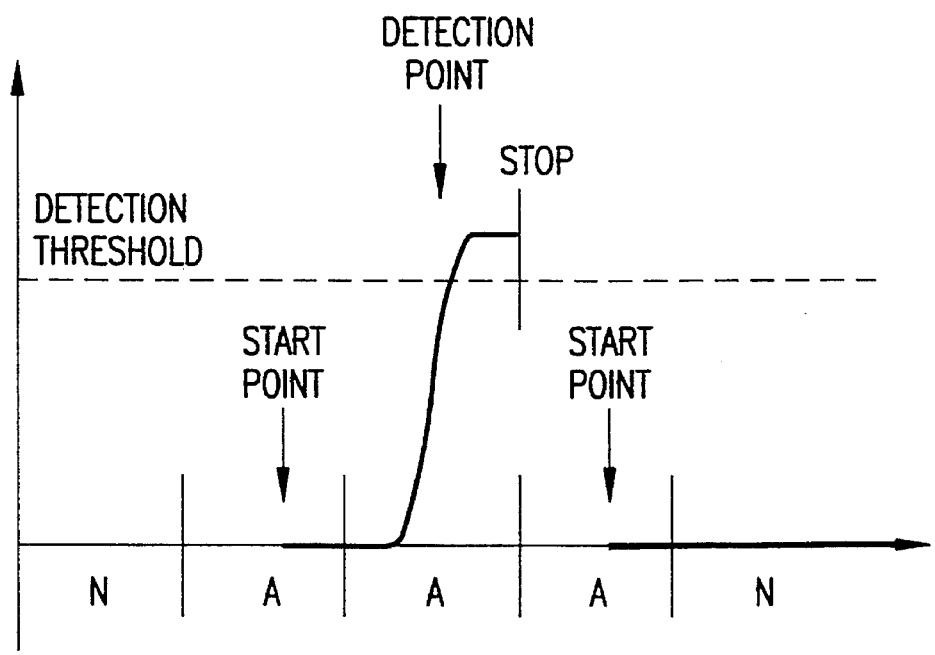

FIG. 19B shows one example of positive output 120-2 outputted from the auxiliary speech recognition neural network unit 20B.

The auxiliary speech recognition neural network unit 20B is controlled normally in an inactive state as shown in FIG. 19B. Each time an action instruction signal from the recognition signal detecting unit 30 is inputted, the auxiliary speech recognition neural network unit 20B is activated to take a recognition action for speech data sequence A for a predetermined reference time, based on the feature vectors 110 outputted from the feature extracting unit 10, and outputs a speech recognition signal 120-2 to the output synthesis unit 50.

The output synthesis unit 50 put together the speech recognition signals 120-1 and 120-2 outputted from the respective neural network units 20A and 20B and outputs it as a speech recognition signal 120. Likewise the first embodiment, it is possible to accurately recognize consecutive input speech data sequence A and also to accurately detect how many recognition object data A existed in the input data.

Figure 20A:
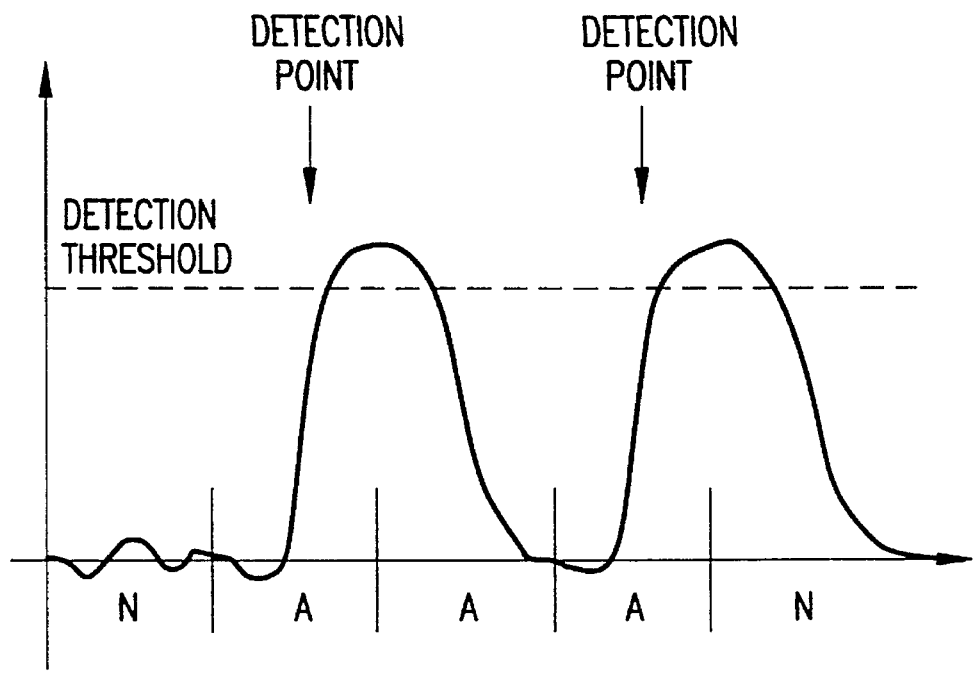
FIGS. 20A and 20B show examples of output to be obtained when actual data is inputted to be speech recognition apparatus of the second embodiment.
Figure 20B:
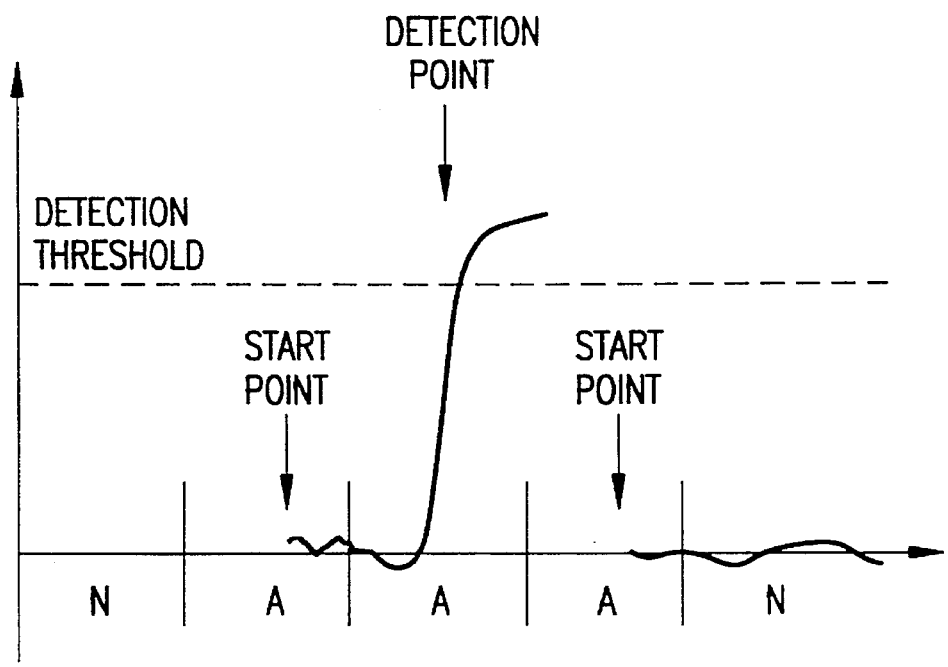

FIGS. 20A and 20B show the results of a test in which speech recognition for actual data took place using the speech recognition apparatus of this embodiment. The data A and data N are identical with those of the first embodiment.

As shown in FIGS. 20A and 20B, also in the speech recognition apparatus of this embodiment, it turned out that consecutive input data A could be accurately recognized at each detection point.

Alternative Embodiments

This invention should by no means be limited to the foregoing embodiments, and various modifications may be suggested within the gist of this invention.

For example, in each of the foregoing embodiments, the recognition signal detecting unit 30 discriminates whether the positive output 120A outputted from the neural network unit 20 exceeds a predetermined threshold Vs and whether the exceeding time is at least the preset value T0, thus detecting the output of the speech recognition signal 120. In order to improve the performance, T0 may be adjusted concurrently in view of the temporal change of output of the speech recognition signal 120.

Further, in the foregoing embodiments, the individual neuron of the neural network unit 20 is exemplified in the form of FIG. 5; however, various alternative kinds of neurons may be used.

Figure 21:
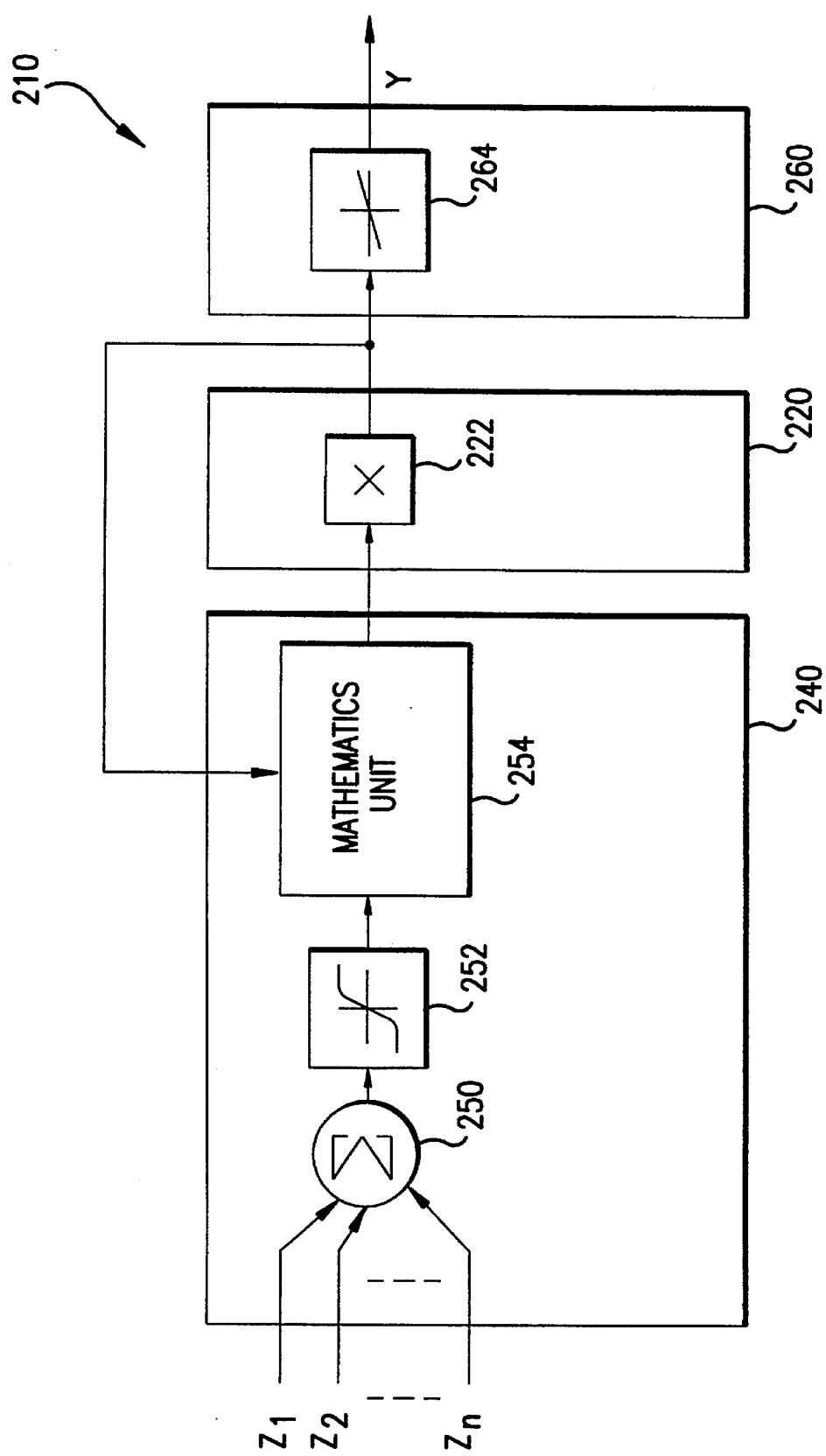
FIG. 21 shows another specific example of dynamic neuron to be used in the second embodiment.

FIG. 21 shows a specific example of alternative dynamic neuron 210 to be used in the neural network unit 20 of this invention.

In the dynamic neuron 210, an internal state update means 240 includes an accumulator 250, a function converter 252 and an mathematics unit 254 and performs mathematical operation based on the following formula to update the internal state value X of an memory 222.

$$\tau \frac{d}{dt} X = -X + S \left( \sum_{j=1}^{n} Z_j \right) \quad \text{[Formula 21]}$$

Namely, the accumulator 250 integrates inputs Zj while the function converter 252 converts the integrated value using a sigmoid (logistic) function S. The mathematics device 254 takes mathematical operation of Formula 21, based on the converted value and the internal state value X of the memory 222, to obtain a new internal state value X, and to update the internal state value X of the memory 222.

A more specific mathematical operation as expressed by the following formula may be executed.

$$\tau \frac{d}{dt} X_i = -X_i + S\left(\sum_{j=1}^{n} W_{ij}Y_j + D_i + \theta_i\right) \quad \text{[Formula 22]}$$

where Wij is the connection strength in connecting the output of j-th neuron to the input of i-th neuron, Di is the external input value, and θi is the bias value. This bias value may be regarded as a combination with a fixed value as included in Wij.

The specific form of the value restriction function S is exemplified by a sigmoid function of a positive-negative symmetric output.

The output mapping means 260 is designed as a function mathematics unit 264 for converting the internal state value X to the output value Y which is obtained by multiplying X by a constant number.

Furthermore, in each of the foregoing embodiments, pieces of speech data sequence to be recognized have been words. This invention should by no means be limited to this example; various alternative kinds of data, for example, various kinds of phonemes or syllables may be recognized.

What is claimed is:

1. A speech recognition apparatus which recognizes a continuous input speech data sequence, the speech recognition apparatus recognizing the frequency of successively input identical input speech data sequences, comprising:

feature extracting means for extracting a sequence of feature vectors from the continuous input speech data sequence by segmenting the continuous input speech data sequence into a sequence of frames and converting each frame of the sequence of frames of the continuous input speech data sequence into the sequence of feature vectors;

speech recognition single-layered neural network means coupled to the feature extracting means for recognizing the sequence of feature vectors of the input speech data sequence input from the feature extracting means based on at least one learned predetermined input speech data sequence and for generating a speech recognition signal when the continuous input speech data sequence matches the at least one learned predetermined input speech data sequence;

recognition signal detection means coupled to the speech recognition neural network means for detecting the speech recognition signal generated by said speech recognition neural network means and for generating a reset instruction signal; and internal state value setting means coupled to the speech recognition neural network means and the recognition signal detection means for setting an internal state value of the speech recognition neural network means by storing an initial value of the internal state value of said speech recognition neural network means and setting the internal state value of said speech recognition neural network means to the initial value based on the reset instruction signal generated by the recognition signal detection means, wherein the initial value is one of a plurality of internal state values.

2. A speech recognition apparatus according to claim 1, wherein said speech recognition neural network means is comprised of a plurality of interconnected dynamic neurons, each i-th dynamic neuron having a neuron internal state value $X_i$, where i=1 to n and n is a natural number said neuron internal state value $X_i$ of each i-th dynamic neuron changing with time to a value determined by a function $X_i = G(X_i, Z_{ij})$, where i and j=1 to n, $Z_{ij}$ is input data to the i-th dynamic neuron from a j-th neuron, each of said dynamic neurons generating an output value based on a function $F(X_i)$ where $X_i$ is the i-th neuron internal state value, and wherein said internal state value setting means includes a buffer memory, the internal state value setting means storing the internal state value of each of said dynamic neurons in the buffer memory as the neuron initial value when said speech recognition neural network means is stable.

3. A speech recognition apparatus according to claim 2, wherein said recognition signal detecting means generates the reset instruction signal when the speech recognition signal is continuously generated by said speech recognition neural network means for a predetermined time.

4. A speech recognition apparatus according to claim 3, wherein said function $X_i = G(X_i, Z_{ij})$ is $$\tau \frac{d}{dt} X_i = -X_i + \sum_{j=1}^{n} Z_{ij}$$

where τ is a constant.

5. A speech recognition apparatus according to claim 4, wherein said function $F(X_i)$ of each of said dynamic neurons is a sigmoid function.

6. A speech recognition apparatus according to claim 5, wherein said input data $Z_{ij}$ to each of said dynamic neurons includes the output value of the same neuron multiplied by a weight.

7. A speech recognition apparatus according to claim 6, wherein said input data $Z_{ij}$ to each said dynamic neurons includes the outputs of other neurons, each of the outputs of the other neurons multiplied by a corresponding weight.

8. A speech recognition apparatus according to claim 7, wherein said input data $Z_{ij}$ to each of said dynamic neurons includes an external input value.

9. A speech recognition apparatus according to claim 8, wherein said speech recognition neural network means includes a plurality of input neurons for inputting the sequence of said feature vectors of said continuous input speech data sequence input from the feature extracting means, a first output neuron for generating a positive signal output only when the input speech data sequence matches one of the at least one learned predetermined input speech data sequence, and a second output neuron for generating a negative signal output only when the input speech data sequence does not match one of the at least one learned predetermined input speech data sequence.

10. A speech recognition apparatus according to claim 4, wherein said function $F(X_i)$ of each of said dynamic neurons is a threshold function.

11. A speech recognition apparatus according to claim 3, wherein said function $X_i = G(X_i, Z_{ij})$ is $$\tau \frac{d}{dt} X_i = -X_i + \sum_{j=1}^{n} W_{ij}Y_j + D_i + \theta_i$$

where $W_{ij}$ is a connection strength connecting an output $Y_j$ of the j-th neuron to an input of the i-th neuron, $D_i$ is an external input value, τ is a constant and $\theta_i$ is a bias value.

12. A speech recognition apparatus according to claim 4, wherein said function $X_i=G(X_i,Z_{ij})$ is $$\tau \frac{d}{dt} X_i = -X_i + S\left(\sum_{j=1}^{n} Z_{ij}\right)$$

where S is a sigmoid function and $\tau$ is a constant.

13. A speech recognition apparatus according to claim 3, wherein said function $X_i=G(X_i,Z_{ij})$ is $$\tau \frac{d}{dt} X_i = -X_i + S\left(\sum_{j=1}^{n} W_{ij}Y_j + D_i + \theta_i\right)$$

where S is a sigmoid function, $W_{ij}$ is a connection strength connecting an output $Y_j$ of the j-th neuron to an input of the i-th neuron, $D_i$ is an external input value, $\tau$ is a constant and $\theta_i$ is a bias value.

14. A speech recognition apparatus according to claim 3, wherein said speech recognition neural network means includes at least one input neuron for inputting the sequence of feature vectors of said input speech data sequence from the feature extracting means, and at least one recognition result output neuron generating the recognition result of said speech recognition neural network means.

15. A speech recognition apparatus according to claim 2, wherein said function $X_i=G(X_i,Z_{ij})$ is $$\tau \frac{d}{dt} X_i = -X_i + \sum_{j=1}^{n} Z_{ij}$$

where $\tau$ is a constant.

16. A speech recognition apparatus according to claim 2, wherein said function $X_i=G(X_i,Z_j)$ is $$\tau \frac{d}{dt} X_i = -X_i + \sum_{j=1}^{n} W_{ij}Y_j + D_i + \theta_i$$

where $W_{ij}$ is a connection strength connecting an output $Y_j$ of the j-th neuron to an input of the i-th neuron, $D_i$ is an external input value, $\tau$ is a constant and $\theta_i$ is a bias value.

17. A speech recognition apparatus according to claim 2, wherein said function $X_i=G(X_i,Z_{ij})$ is $$\tau \frac{d}{dt} X_i = -X_i + S\left(\sum_{j=1}^{n} Z_{ij}\right)$$

where S is a sigmoid function and $\tau$ is a constant.

18. A speech recognition apparatus according to claim 2, wherein said function $X_i=G(X_i,Z_{ij})$ is $$\tau \frac{d}{dt} X_i = -X_i + S\left(\sum_{j=1}^{n} W_{ij}Y_j + D_i + \theta_i\right)$$

where S is a sigmoid function, $W_{ij}$ is a connection strength connecting an output $Y_j$ of the j-th neuron to an input of the i-th neuron, $D_i$ is an external input value, $\tau$ is a constant and $\theta_i$ is a bias value.

19. A speech recognition apparatus according to claim 2, wherein said function $F(X_i)$ of each of said dynamic neurons is a sigmoid function.

20. A speech recognition apparatus according to claim 2, wherein said function $F(X_i)$ of each of said dynamic neurons is a threshold function.

21. A speech recognition apparatus according to claim 2, wherein said input data $Z_{ij}$ to each of said dynamic neurons includes the output value of the same neuron multiplied by a weight.

22. A speech recognition apparatus according to claim 2, wherein said input data $Z_{ij}$ to each of said dynamic neurons includes the outputs of other neurons, each of the outputs of the other neurons multiplied by a corresponding weight.

23. A speech recognition apparatus according to claim 2, wherein said input data $Z_{ij}$ to each of said dynamic neurons includes an external input value.

24. A speech recognition apparatus according to claim 2, wherein said speech recognition neural network means includes at least one input neuron for inputting the feature vector of said continuous input speech data sequence from the feature extracting means, and at least one recognition result output neuron generating the recognition result of said speech recognition neural network means.

25. A speech recognition apparatus according to claim 2, wherein said speech recognition neural network means includes a plurality of input neurons for inputting the sequence of said feature vectors of said continuous input speech data sequence input from the feature extracting means, a first output neuron for generating a positive signal output only when the input speech data matches one of the at least one learned predetermined input speech data sequence, and a second output neuron for generating a negative signal output only when the input speech data sequence does not match one of the at least one learned predetermined input speech data sequence.

26. A speech recognition apparatus according to claim 1, wherein said recognition signal detecting means generates the reset instruction signal when the speech recognition signal is continuously generated by said speech recognition neural network means for a predetermined time.

27. A speech recognition apparatus according to claim 1, wherein the plurality of internal state values are generated by the speech recognition neural network means.

28. A speech recognition apparatus according to claim 27, wherein said internal state values are variable values.

29. A speech recognition apparatus according to claim 1, wherein said initial value is a variable value.

30. A speech recognition apparatus which recognizes a continuous input speech data sequence, comprising:

feature extracting means for extracting a sequence of feature vectors from the continuous input speech data sequence by segmenting input the continuous speech data sequence into a sequence of frames and converting each frame of the sequence of frame of the continuous input speech data sequence into the sequence of feature vectors;

first speech recognition neural network means coupled to the feature extracting means for recognizing the sequence of feature vectors of the continuous input speech data sequence input from the feature extracting means based on at least one learned predetermined input speech data sequence and for generating a first speech recognition signal when the continuous input speech data sequence matches the at least one learned predetermined input speech data sequence;

recognition signal detection means coupled to the speech recognition neural network means for generating an action instruction signal upon each detection of the first speech recognition signal generated by said first speech recognition neural network means;

second speech recognition neural network means for recognizing the sequence of feature vectors of the continuous input speech data sequence input from the feature extracting means based on the at least one learned predetermined input speech data sequence and for generating a second speech recognition signal, when said action instruction signal is generated and the input speech data sequence matches the at least one learned predetermined input speech data sequence; and output generating means for selecting one of the first and second speech recognition signals generated by said first and second speech recognition neural network means as an output speech recognition signal.

31. A speech recognition apparatus according to claim 30, wherein said second speech recognition neural network means is reset each time the second recognition signal is generated for a predetermined time.

32. A speech recognition apparatus according to claim 31, wherein said second speech recognition neural network means is comprised of a plurality of interconnected dynamic neurons, each i-th dynamic neuron having a neuron internal state value $X_i$ where i=1 to n and n is a natural number, said neuron internal state value $X_i$ of each i-th dynamic neuron changing with time to a value determined by a function $X_i=G(X_i,Z_{ij})$ where i and j=1 to n and $Z_{ij}$ is input data to each of said i-th dynamic neurons from the j-th dynamic neuron, said dynamic neuron converting said internal state value $X_i$ into an output value determined by a function $F(X_i)$.

33. A speech recognition apparatus according to claim 32, wherein said function $X_i=G(X_i,Z_{ij})$ is $$\tau \frac{d}{dt} X_i = -X_i + \sum_{j=1}^{n} W_{ij}Y_j + D_i + \theta_i$$

where $W_{ij}$ is a connection strength connecting an output of the j-th neuron $Y_j$ to an input of the i-th neuron, $D_i$ is an external input value, $\tau$ is a constant and $\theta_i$ is a bias value.

34. A speech recognition apparatus according to claim 32, wherein said function $X_i=G(X_i,Z_{ij})$ is $$\tau \frac{d}{dt} X_i = -X_i + S\left(\sum_{j=1}^{n} Z_{ij}\right)$$

where S is a sigmoid function and $\tau$ is a constant.

35. A speech recognition apparatus according to claim 32, wherein said function $X_i=G(X_i,Z_{ij})$ is $$\tau \frac{d}{dt} X_i = -X_i + S\left(\sum_{j=1}^{n} W_{ij}Y_j + D_i + \theta_i\right)$$

where S is a sigmoid function, $W_{ij}$ is a connection strength connecting an output $Y_j$ of the j-th neuron to an input of the i-th neuron, $D_i$ is an external input value, $\tau$ is a constant and $\theta_i$ is a bias value.

36. A speech recognition apparatus according to claim 32, wherein said function $F(X_i)$ of each of said dynamic neurons is a sigmoid function.

37. A speech recognition apparatus according to claim 32, wherein said function $F(X_i)$ of each of said dynamic neurons is a threshold function.

38. A speech recognition apparatus according to claim 32, wherein said input data $Z_{ij}$ to each of said dynamic neurons includes the output value of the same neuron multiplied by a weight.

39. A speech recognition apparatus according to claim 38, wherein said input data $Z_{ij}$ to each said dynamic neurons includes the outputs of other neurons, each of the outputs of the other neurons multiplied by a corresponding weight.

40. A speech recognition apparatus according to claim 39, wherein said input data $Z_{ij}$ to each of said dynamic neurons includes an external input value.

41. A speech recognition apparatus according to claim 40, wherein said speech recognition neural network means includes a plurality of input neurons for inputting said sequence of feature vectors of said continuous input speech data sequence input from the feature extracting means, a first output neuron for generating a positive signal output only when the input speech data sequence matches one of the at least one learned predetermined input speech data sequence, and a second output neuron for generating a negative signal output only when the input speech data sequence does not match one of the at least one learned predetermined input speech data sequence.

42. A speech recognition apparatus according to claim 32, wherein said speech recognition neural network means includes at least one input neuron for inputting the sequence of feature vectors of said input speech data sequence from the feature extracting means and at least one recognition result output neuron generating the recognition result of said speech recognition neural network means.

43. A speech recognition apparatus according to claim 32, wherein said function $X_i=G(X_i,Z_{ij})$ is $$\tau \frac{d}{dt} X_i = -X_i + \sum_{j=1}^{n} Z_{ij}$$

where $\tau$ is a constant.

44. A speech recognition apparatus according to claim 30, wherein each of said first and second speech recognition neural network means is comprised of a plurality of interconnected dynamic neurons, each dynamic neuron having a neuron internal state value $X_i$ where i=0 and n is a material number, said neuron internal state value $X_i$ of each i-th dynamic neuron changing with time to a value determined by a function $X_i=G(X_i,Z_{ij})$ where i and j=1 to n and $Z_{ij}$ is input data to each of said i-th dynamic neurons from a j-th dynamic neuron, said dynamic neuron converting said internal state value $X_i$ into an output value determined by a function $F(X_i)$.

45. A speech recognition apparatus according to claim 44, wherein said function $X_i=G(X_i,Z_{ij})$ is $$\tau \frac{d}{dt} X_i = -X_i + \sum_{j=1}^{n} Z_{ij}$$

where $\tau$ is a constant.

46. A speech recognition apparatus according to claim 44, wherein said function $X_i=G(X_i,Z_{ij})$ is $$\tau \frac{d}{dt} X_i = -X_i + \sum_{j=1}^{n} W_{ij}Y_j + D_i + \theta_i$$

where $W_{ij}$ is a connection strength connecting an output of the j-th neuron $Y_j$ to an input of the i-th neuron, $D_i$ is an external input value, $\tau$ is a constant and $\theta_i$ is a bias value.

47. A speech recognition apparatus according to claim 44, wherein said function $X_i=G(X_i,Z_{ij})$ is $$\tau\frac{d}{dt}X_i = -X_i + S\left(\sum_{j=1}^{n} Z_{ij}\right)$$

where S is a sigmoid function and $\tau$ is a constant.

48. A speech recognition apparatus according to claim 44, wherein said function $X_i=G(X_i,Z_{ij})$ is $$\tau\frac{d}{dt}X_i = -X_i + S\left(\sum_{j=1}^{n} W_{ij}Y_j + D_i + \theta_i\right)$$

where S is a sigmoid function, $W_{ij}$ is a connection strength connecting an output $Y_j$ of the j-th neuron to an input of the i-th neuron, $D_i$ is an external input value, $\tau$ is a constant and $\theta_i$ is a bias value.

49. A speech recognition apparatus according to claim 44, wherein said function $F(X_i)$ of each of said dynamic neurons is a sigmoid function.

50. A speech recognition apparatus according to claim 44, wherein said function $F(X_i)$ of each of said dynamic neurons is a threshold function.

51. A speech recognition apparatus according to claim 44, wherein said input data $Z_{ij}$ to each of said dynamic neurons includes the output value of the same neuron multiplied by a weight.

52. A speech recognition apparatus according to claim 44, wherein said input data $Z_{ij}$ to each of said dynamic neurons includes the outputs of other neurons, each the outputs of the other neurons multiplied by a corresponding weight.

53. A speech recognition apparatus according to claim 43, wherein said input data $Z_{ij}$ to each of said dynamic neurons includes an external input value.

54. A speech recognition apparatus according to claim 44, wherein said speech recognition neural network means includes at least one input neuron for inputting the sequence of feature vectors of said continuous input speech data sequence from the feature extracting means, and at least one recognition result output neuron generating the recognition result of said speech recognition neural network means.

55. A speech recognition apparatus according to claim 43, wherein said speech recognition neural network means includes a plurality of input neurons for inputting said sequence of feature vectors of said continuous input speech data sequence input from the feature extracting means, a first output neuron for generating a positive signal output only when the input speech data sequence matches one of the at least one learned predetermined input speech data sequence, and a second output neuron for generating a negative signal output only when the input speech data sequence does not match one of the at least one learned predetermined input speech data sequence.

* * * * *